(12) United States Patent
Morozumi et al.

(10) Patent No.: US 8,166,137 B2
(45) Date of Patent: Apr. 24, 2012

(54) CONTROL OF NETWORK PLUG-AND-PLAY COMPLIANT DEVICE

(75) Inventors: Hideki Morozumi, Nagano-ken (JP); Kenji Sakuda, Nagano-ken (JP); Yasuhiro Oshima, Nagano-ken (JP); Tsutomu Motegi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1907 days.

(21) Appl. No.: 11/269,556

(22) Filed: Nov. 9, 2005

(65) Prior Publication Data

US 2006/0117084 A1 Jun. 1, 2006

(30) Foreign Application Priority Data

Nov. 12, 2004 (JP) ................... 2004-329319

(51) Int. Cl.
*G06F 15/177* (2006.01)
(52) U.S. Cl. ......... 709/220; 709/202; 709/227; 709/231
(58) Field of Classification Search .................. 709/220, 709/202, 227, 231
See application file for complete search history.

(56) References Cited

U.S. PATENT DOCUMENTS

| | | | |
|---|---|---|---|
| 6,910,068 B2 * | 6/2005 | Zintel et al. .................... | 709/220 |
| 7,331,049 B1 * | 2/2008 | Jin ................................ | 719/314 |
| 7,398,306 B2 * | 7/2008 | Yoshida et al. ................ | 709/223 |
| 2003/0137693 A1 | 7/2003 | Nishio | |
| 2003/0220988 A1 * | 11/2003 | Hymel .......................... | 709/220 |
| 2005/0054289 A1 * | 3/2005 | Salazar et al. .................. | 455/39 |
| 2006/0004939 A1 * | 1/2006 | Edwards et al. ............... | 710/302 |
| 2006/0041924 A1 * | 2/2006 | Bushmitch et al. ............ | 725/132 |
| 2006/0164550 A1 * | 7/2006 | Yoshimoto et al. ............ | 348/571 |
| 2006/0165110 A1 * | 7/2006 | Magendanz et al. .......... | 370/419 |
| 2006/0184510 A1 * | 8/2006 | Nishio .............................. | 707/3 |
| 2007/0066281 A1 * | 3/2007 | Savinen et al. ............. | 455/412.1 |
| 2007/0297352 A1 * | 12/2007 | Jabri et al. ..................... | 370/261 |

FOREIGN PATENT DOCUMENTS

| | | | |
|---|---|---|---|
| FR | 2837045 | * | 6/2002 |
| FR | 2837045 | * | 8/2002 |
| FR | 2837045 | * | 9/2003 |
| JP | 2001-290724 A | | 10/2001 |
| JP | 2003-008610 A | | 1/2003 |
| JP | 2003-216383 A | | 7/2003 |

* cited by examiner

*Primary Examiner* — Lan-Dai T Truong

(57) ABSTRACT

When the network protocol controller 302 of the network device 200 receives a message sent from a client, it interprets the message header in accordance with network plug-and-play protocol without interpreting the content of the message body; and sends the message body to the device controller 402 in accordance with another communication protocol. The device controller 402 interprets the content of the message body and causes the service devices 404, 406 to execute service.

14 Claims, 23 Drawing Sheets

Fig.4A
USB interface/endpoint configuration
Fig.4B
Logical channel configuration
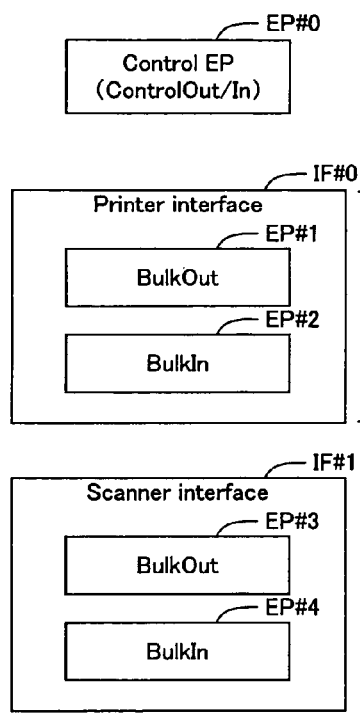
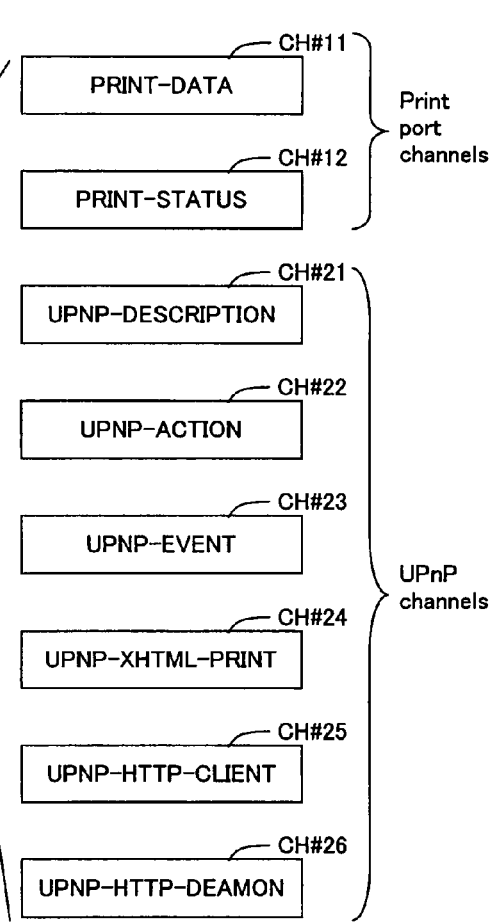

D4 packet configuration (for USB transfer)

UPnP device configuration of the Embodiment

UPnP device configuration of Comparative example

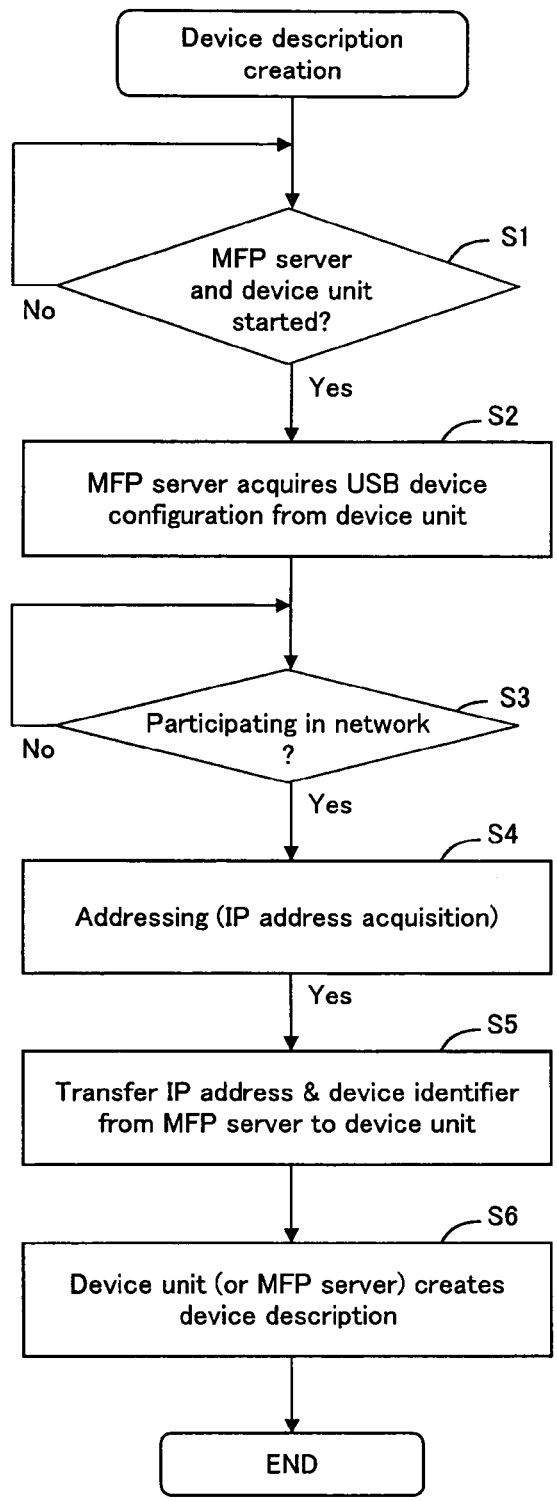

Fig.9

Example of device description

```
<?xml version="1.0" ?>
<root xmlns="urn:schemas-upnp-org:device-1-0">
 <specVersion>
  <major>1</major>
  <minor>0</minor>
 </specVersion>
 <URLBase>http://169.254.100.100:80</URLBase>
 <device>
  <deviceType>urn:schemas-upnp-org:device:Basic:1</deviceType>
  ...
  <deviceList>
   <device>
    <deviceType>urn:schemas-upnp-org:device:Printer:1</deviceType>
    ...
    <presentationURL>http://169.254.100.100:80/Printer1</presentationURL>
    <serviceList>
     <service>
      <serviceType>urn:schemas-upnp-org:service:PrintBasic:1</serviceType>
      <serviceId>urn:upnp-org:serviceId:Print1</serviceId>
      <SCPDURL>/Printer1/SCPD/PRINTBASIC.XML</SCPDURL>
      <controlURL>/Printer1/control</controlURL>
      <eventSubURL>/Printer1/event</eventSubURL>
     </service>
    </serviceList>
   </device>
   <device>
    <deviceType>urn:schemas-upnp-org:device:Scanner:1</deviceType>
    ...
    <presentationURL>http://169.254.100.100:80/Scanner1</presentationURL>
    <serviceList>
     <service>
      <serviceType>urn:schemas-upnp-org:service:Scan:1</serviceType>
      <serviceId>urn:upnp-org:serviceId:Scan1</serviceId>
      <SCPDURL>/Scanner1/SCPD/SCANNER.XML</SCPDURL>
      <controlURL>/Scanner1/control</controlURL>
      <eventSubURL>/Scanner1/event</eventSubURL>
     </service>
    </serviceList>
   </device>
  </deviceList>
 </device>
</root>
```

Basic device: lines starting with `<device>` through `<deviceList>`

Printer: the first inner `<device>` block

Scanner: the second inner `<device>` block

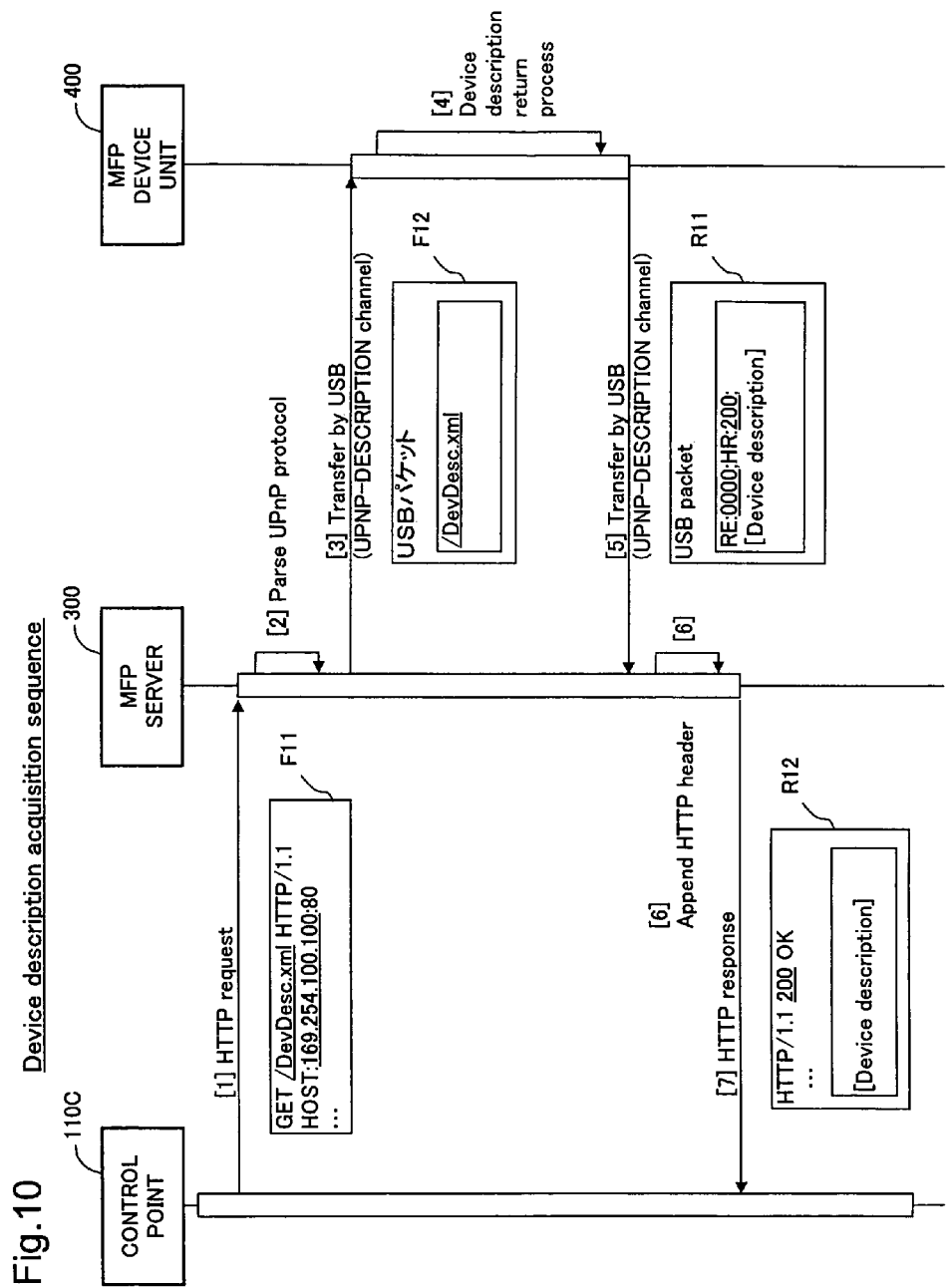

UPnP device configuration after addition of device unit

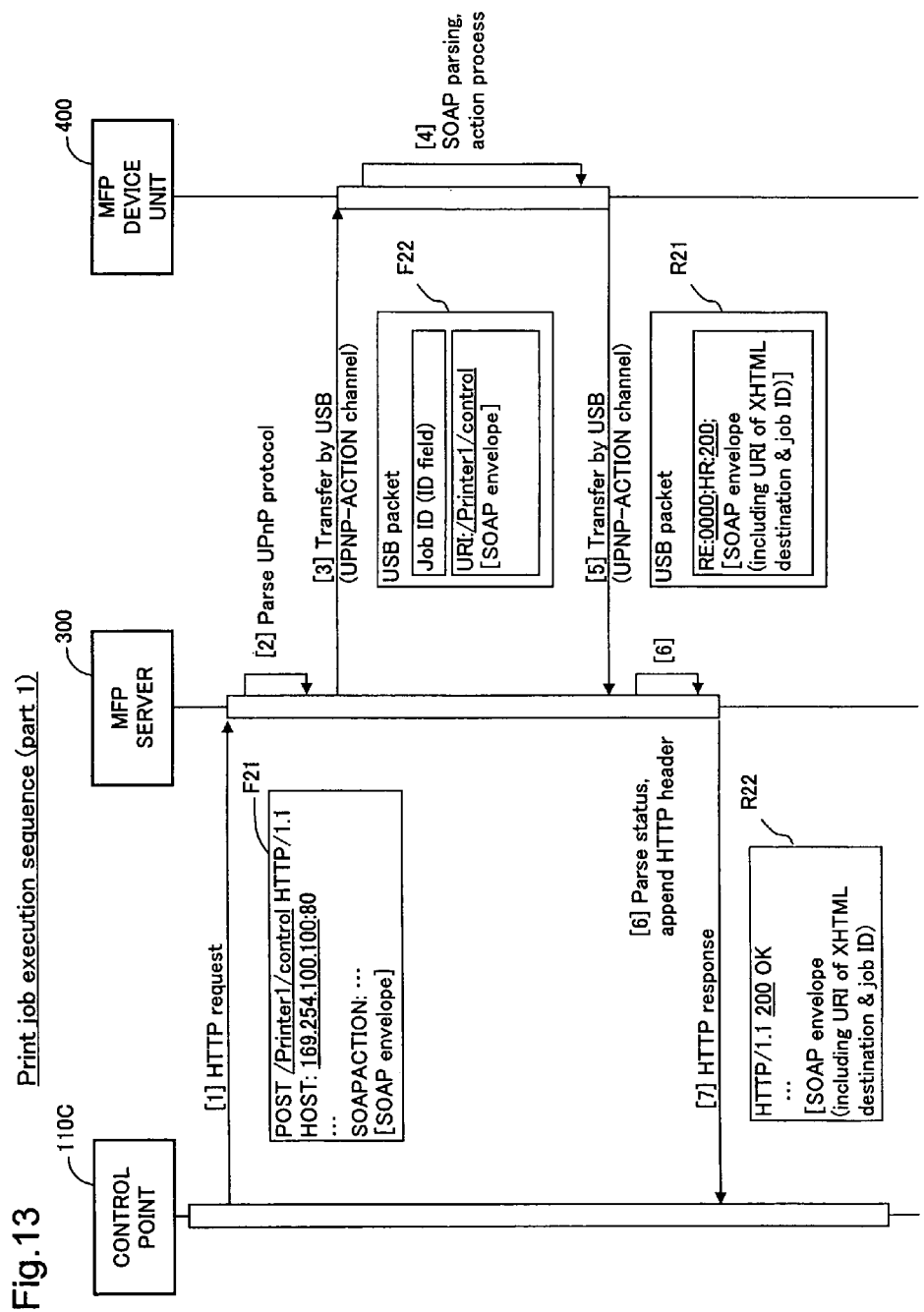

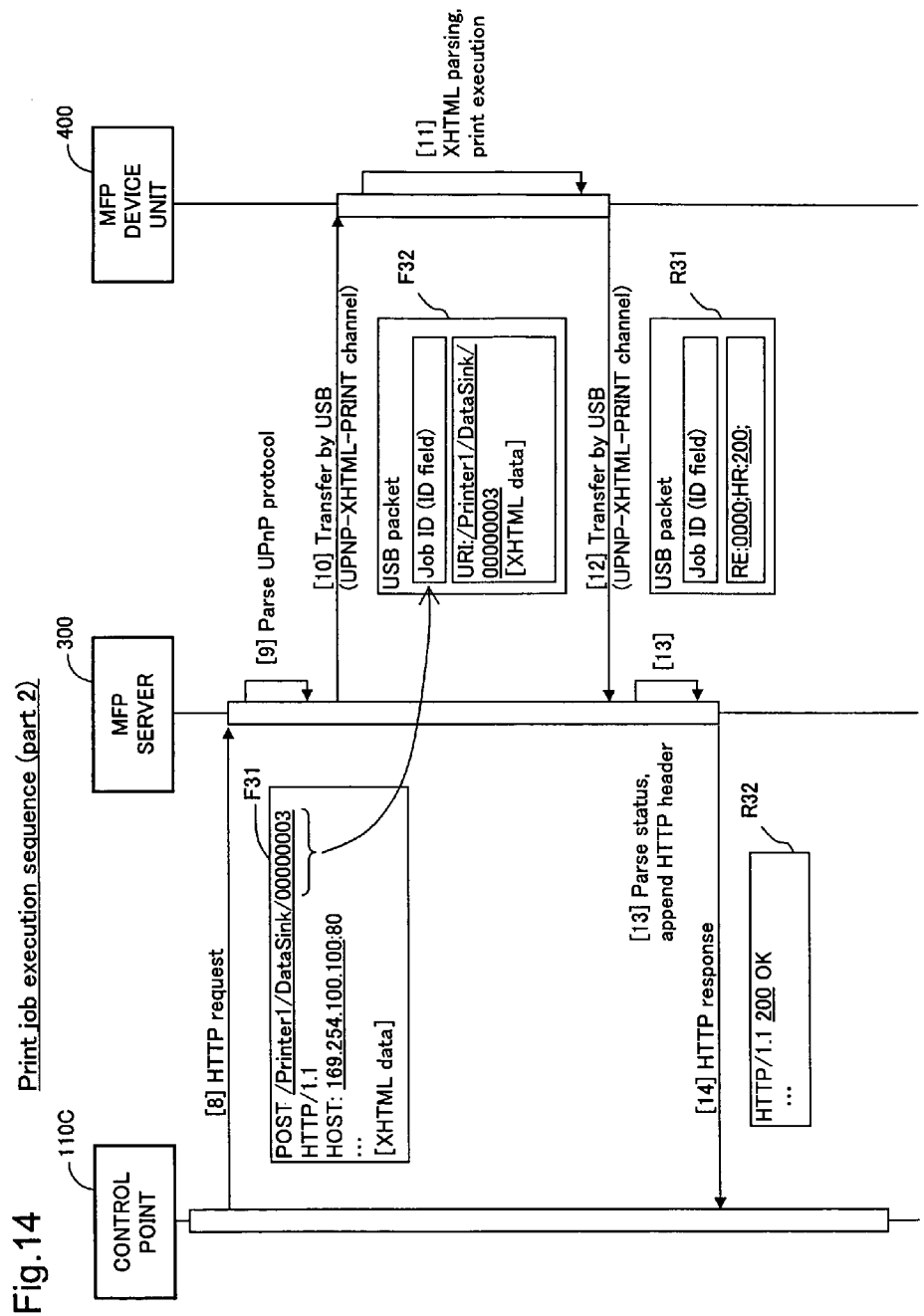

Fig.15

Information transferred during execution of print job (see Fig. 13)

F21
```
POST /Printer1/control HTTP/1.1
HOST: 169.254.100.100:80
CONTENT-TYPE: text/xml; charset="utf-8"
CONTENT-LENGTH: 252
SOAPACTION: "urn:schemas-upnp-org:service:PrintBasic:1#CreateJob"
<s:Envelope xmlns:s="http://schemas.xmlsoap.org/soap/envelope/"
s:encodingStyle="http://schemas.xmlsoap.org/soap/encoding/">
  <s:Body>
    <u:CreateJob xmlns:u="urn:schemas-upnp-org:service:PrintBasic:1">
    </u:CreateJob>
  </s:Body>
</s:Envelope>
``` copy

F22
```
URI:/Printer1/control
<s:Envelope xmlns:s="http://schemas.xmlsoap.org/soap/envelope/"
s:encodingStyle="http://schemas.xmlsoap.org/soap/encoding/">
  <s:Body>
    <u:CreateJob xmlns:u="urn:schemas-upnp-org:service:PrintBasic:1">
    </u:CreateJob>
  </s:Body>
</s:Envelope>
```

R21
```
RE:0000;HR:200;
<s:Envelope xmlns:s="http://schemas.xmlsoap.org/soap/envelope/"
 s:encodingStyle="http://schemas.xmlsoap.org/soap/encoding/">
  <s:Body>
    <u:CreateJobResponse xmlns:u="urn:schemas-upnp
-org:service:PrintBasic:1">
      <DataSink> /Printer1/DataSink/00000003 </DataSink>
      <JobId>3</JobId>
    </u:CreateJobResponse>
  </s:Body>
</s:Envelope>
```

Fig.17

Information transferred during execution of global action (job cancel)

F41
```
POST /Printer1/control HTTP/1.1
HOST: 169.254.100.100:80
CONTENT-TYPE: text/xml; charset="utf-8"
CONTENT-LENGTH: 252
SOAPACTION: "urn:schemas-upnp-org:service:PrintBasic:1#CancelJob"
 <s:Envelope xmlns:s="http://schemas.xmlsoap.org/soap/envelope/"
 s:encodingStyle="http://schemas.xmlsoap.org/soap/encoding/">
  <s:Body>
   <u:CancelJob xmlns:u="urn:schemas-upnp-org:service:PrintBasic:1">
    <JobId>3</JobId>
   </u:CancelJob>
  </s:Body>
 </s:Envelope>
``` copy

F42
```
URI:/Printer1/control
 <s:Envelope xmlns:s="http://schemas.xmlsoap.org/soap/envelope/"
 s:encodingStyle="http://schemas.xmlsoap.org/soap/encoding/">
  <s:Body>
   <u:CancelJob xmlns:u="urn:schemas-upnp-org:service:PrintBasic:1">
    <JobId>3</JobId>
   </u:CancelJob>
  </s:Body>
 </s:Envelope>
```

R41
```
RE:0000;HR:200;
<s:Envelope xmlns:s="http://schemas.xmlsoap.org/soap/envelope/"
 s:encodingStyle="http://schemas.xmlsoap.org/soap/encoding/">
 <s:Body>
  <u:CancelJobResponse xmlns:u="urn:schemas-upnp-
org:service:PrintBasic:1">
  </u:CancelJobResponse>
 </s:Body>
</s:Envelope>
```

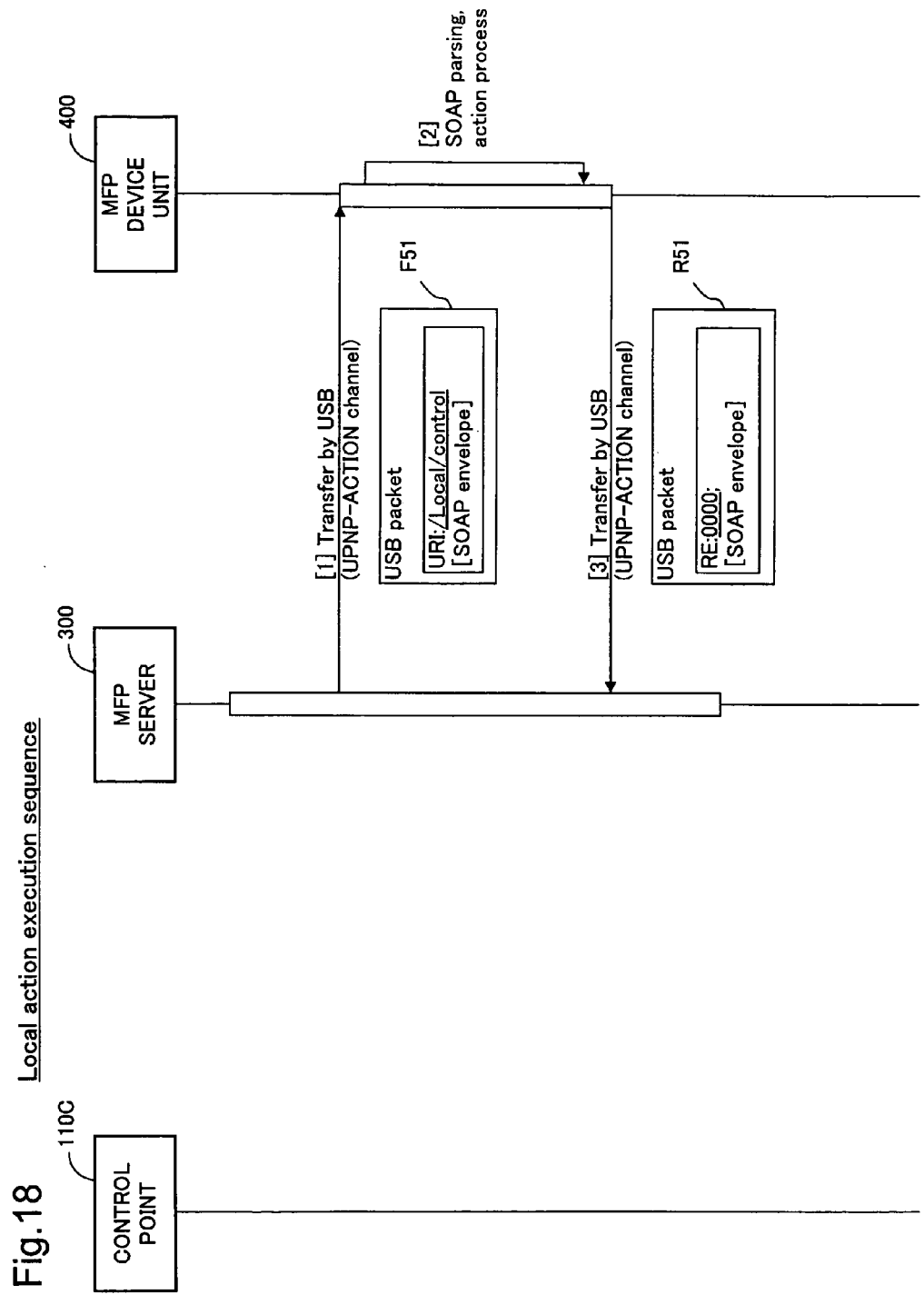

Fig.19

Information transferred during execution of local action

F51

```
/Local/control
<s:Envelope xmlns:s="http://schemas.xmlsoap.org/soap/envelope/"
 s:encodingStyle="http://schemas.xmlsoap.org/soap/encoding/">
 <s:Body>
  <u:x_GetInfo xmlns:u="urn:schemas-epson-com:service:Local:1">
  </u:x_GetInfo>
 </s:Body>
</s:Envelope>
```

R51

```
RE:0000;
<s:Envelope xmlns:s="http://schemas.xmlsoap.org/soap/envelope/"
 s:encodingStyle="http://schemas.xmlsoap.org/soap/encoding/">
 <s:Body>
  <u:x_GetInfoResponse xmlns:u="urn:schemas-epson-
com:service:Local:1">
  ...
  </u:x_GetInfoResponse>
 </s:Body>
```

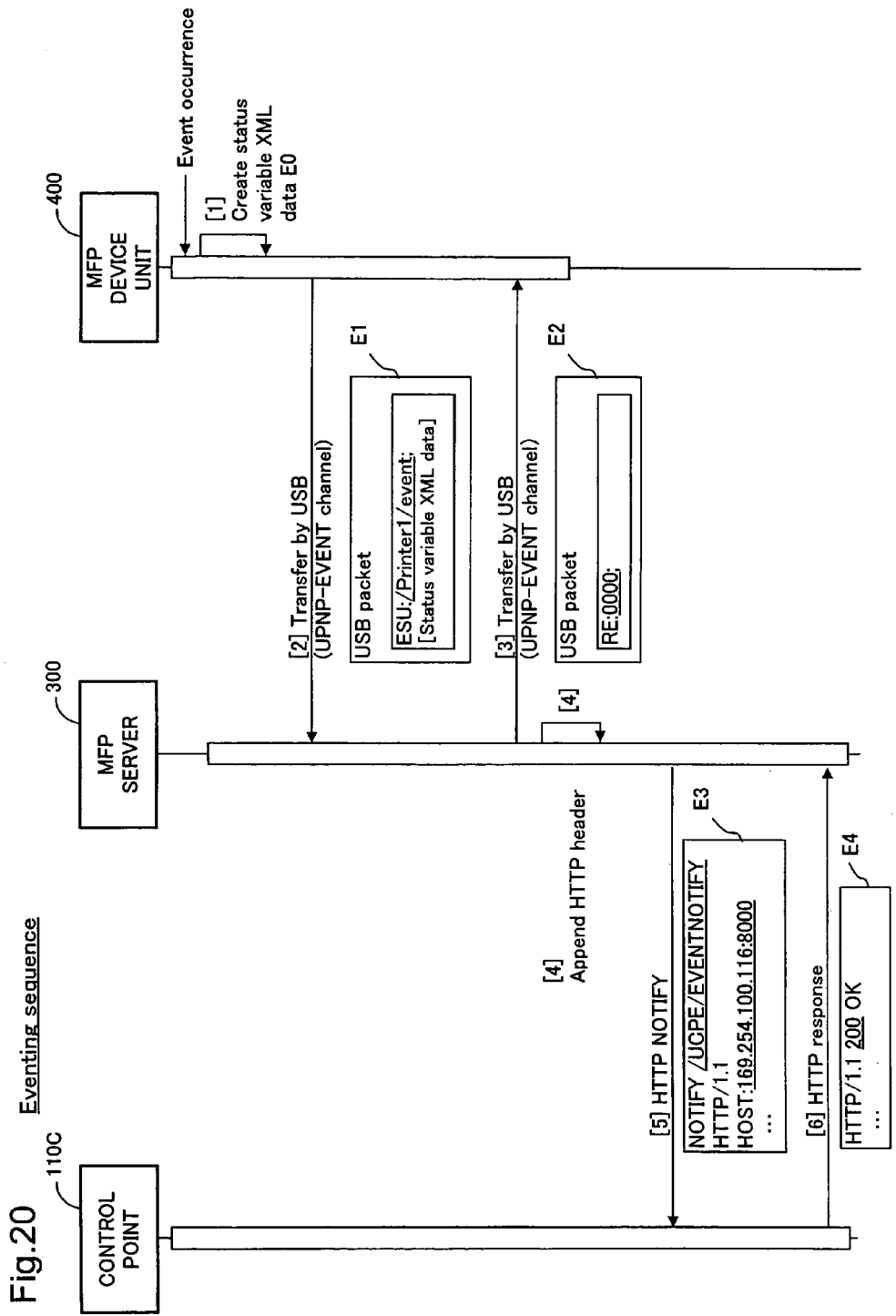

CONTROL OF NETWORK PLUG-AND-PLAY COMPLIANT DEVICE

CROSS-REFERENCE TO RELATED APPLICATIONS

The present application claims the priority based on Japanese Patent Application No. 2004-329319 filed on Nov. 12, 2004, the disclosure of which is hereby incorporated by reference in its entirety.

BACKGROUND OF THE INVENTION

1. Field of the Invention

The present invention relates to control technology for a network device compliant with network plug-and-play.

2. Description of the Related Art

Plug-and-play is a well-known technology that enables peripheral devices to be connected to a computer or disconnected from a computer at any time, after the computer has been started up. In recent years, extension of plug-and-play technology to networks has led the development of Universal Plug and Play (hereinafter referred to as "UPnP"; UPnP is a trademark of UPnP Implementers Corporation). The use of UPnP enables network devices to be connected to a network or disconnected from the network at any time. Herein, the architecture for realizing such plug-and-play capability in a network will be termed "network plug-and-play."

UPnP compliant network devices are able to function as service devices of various kinds. Here, "service device" refers to a device for executing a particular service in response to an external request. Service devices can be realized as devices of various kinds, such as a printer, scanner, fax, copier, memory device, camera, clock or the like. It is also possible for the functions of several service devices to be realized by a single device.

In this way, UPnP compliant network devices can take a variety of forms. On the other hand, where an appropriate device configuration is employed for each of a number of individual network devices, control of the network devices may become complicated, or it may become necessary to modify control methods on an individual network device basis, resulting in the problem of considerable labor entailed in their design and fabrication.

SUMMARY OF THE INVENTION

An object of the present invention to provide technology for simplifying control of a network plug-and-play compliant device.

According to an aspect of the present invention, there is provided a network plug-and-play compliant network device. The network device includes one or more service devices for executing a service in response to a request from a client on a network, a device controller configured to control the service device, and a network protocol controller configured to receive from a client on the network a message having a message header and a message body, and to transfer content of the message body to the device controller. The network protocol controller interprets or parses the message header according to a network plug-and-play protocol without interpreting or parsing the content of the message body received from the client, and transmits the message body to the device controller according to a communications protocol different from the network plug-and-play protocol. The device controller interprets or parses the content of the message body received from the network protocol controller, and causes the service device to execute a service according to a result of the interpretation.

According to this network device, since the network protocol controller interprets the header and transmits the message body to the device controller without interpreting the content of the message body, control in the network protocol controller is not dependent upon the type and number of service devices. As a result, control in the network protocol controller can be simplified.

It is possible for the invention to be reduced to practice in various forms, for example, a network device; a network protocol control device; a control method and a control device for such devices; a computer program for realizing the functions of such a method or device; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIGS. 4A and 4B illustrate USB interface/endpoint configuration and logical channel configuration;

FIG. 8 is a flowchart showing the procedure of creating a device description at startup of the multifunction device is started up;

FIG. 9 shows an example of the device description of the multifunction device;

FIG. 10 shows the sequence of device description acquisition by a control point;

FIG. 13 is a sequence diagram depicting the procedure for executing printing in response to a request from a control point;

FIG. 14 is a sequence diagram depicting the procedure for executing printing in response to a request from a control point;

FIG. 15 illustrates an example of a message during print job execution;

FIG. 17 illustrates an example of a global action message;

FIG. 18 is a sequence diagram depicting a local action execution procedure;

FIG. 19 illustrates an example of a local action message;

FIG. 20 is a sequence diagram depicting an example of the processing routine when an event has occurred.

DESCRIPTION OF THE PREFERRED EMBODIMENT

The embodiments of the invention are described in terms of certain preferred examples, in the order indicated below.
A. Description of Terms:
B. System Overview:
C. Multi Function Device Configuration and Device Description:
D. Print Job Execution Sequence:
E. Action Execution Sequence:
F. Eventing Sequence:
G. Embodiment 2
H. Variation Examples:

A. Description of Terms

The meanings of certain terms used in the following description are as follows.

DHCP: Dynamic Host Configuration Protocol; a protocol for dynamically assigning IP addresses.

GENA: General Event Notification Architecture, used for eventing in UPnP architecture.

HTTP: HyperText Transfer Protocol.

HTTPMU: HTTP Multicast over UDP (User Datagram Protocol).

HTTPU: HTTP unicast over UDP.

MFP: a Multi Function Peripheral device having the functions of several devices.

SOAP: Simple Object Access Protocol, used for action request and response by means of RPC (Remote Procedure Call) in UPnP architecture.

SSDP: Simple Service Discovery Protocol, used for service discovery (detection) in UPnP architecture.

UPnP: Universal Plug and Play (trademark of UPnP Implementers Corporation).

URI; Uniform Resource Identifier; a broader concept of URL (Uniform Resource Locator), and an identifier indicating the unique location of a resource.

XHTML: extensible HyperText Markup Language; a type of text markup language compatible with HTML, representing one implementation of XML. XHTML-print, discussed later, is a standard for printing XHTML documents.

XML: extensible Markup Language

The numerous protocols mentioned above are used in UPnP, and will be referred to collectively as "UPnP protocols."

B. System Overview

Figure 1:
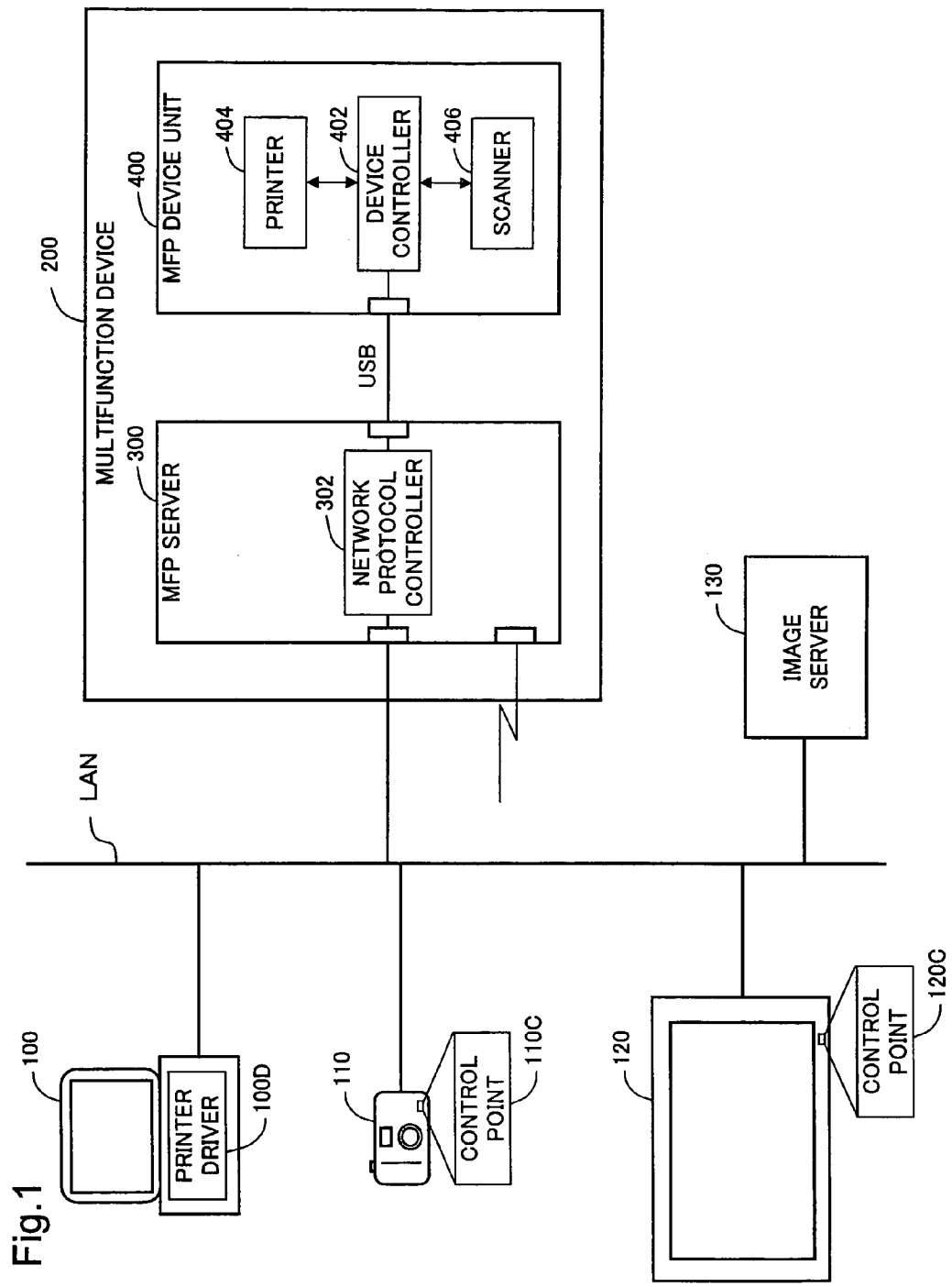
FIG. 1 is a conceptual diagram depicting the configuration of a network system implementing an embodiment of the invention.

FIG. 1 is a conceptual diagram depicting the configuration of a network system implementing an embodiment of the invention. This network system comprises a personal computer 100, a digital camera 110, a TV set 120, an image server 130, and a multifunction device 200, interconnected via a LAN. The LAN may be a wired network according to IEEE 802.3, or a wireless network according to IEEE 802.11b/g/a, for example. The digital camera 110, the TV set 120, and the multifunction device 200 are UPnP compliant network devices. The digital camera 110 and the TV set 120 comprise control points 110C, 120C in UPnP architecture. UPnP architecture and control points will be discussed later. While the personal computer 100 and the image server 130 are one element in this network system, they are not necessarily UPnP compliant.

The personal computer 100 has the function of creating print data for images using a printer driver 100D, and of transferring this print data via the LAN to the multifunction device 200 to print the image. During this printing process, the multifunction device 200 does not use the UPnP protocol, but rather functions as an ordinary network printer. As will be discussed later, in the event that printing is carried out in accordance with a request from a control point (e.g. 110C), the multifunction device 200 will function as a UPnP compliant printer device.

The multifunction device 200 has an MFP server 300 and an MFP device unit 400. The MFP server 300 functions as a network protocol controller 302 for mediating messages exchanged between the MFP device unit 400 and other devices on the LAN. As will be discussed later, in a typical case, when transferring messages, the MFP server 300 parses or interprets the message header according to the UPnP protocol but does not parse or process the message body. The MFP device unit 400 comprises a printer 404 and a scanner 406 as service devices, and a device controller 402 for controlling these devices. There may be additional services besides the printer 404 and the scanner 406. Only one of the printer 404 and the scanner 406 may be provided in the device unit, or they may be provided together with other service devices in the same device unit. The MFP server 300 and the MFP device unit 400 are connected by a USB (Universal Serial Bus). However, it is possible for the two to be connected by some other physical interface.

UPnP is an architecture whereby it is possible to connect a network device to a network or disconnect it from the network, at any time. The UPnP network is composed of the control points 110C, 120C and the devices 404, 406. Here, "device" refers to a device which provides a service. Unless indicated otherwise herein, "device" and "service device" are used as synonyms. A "control point" denotes a controller that detects or controls another device on the network, and functions as a client for a service device. The various functions of UPnP compliant network devices will be discussed later.

Figure 2:
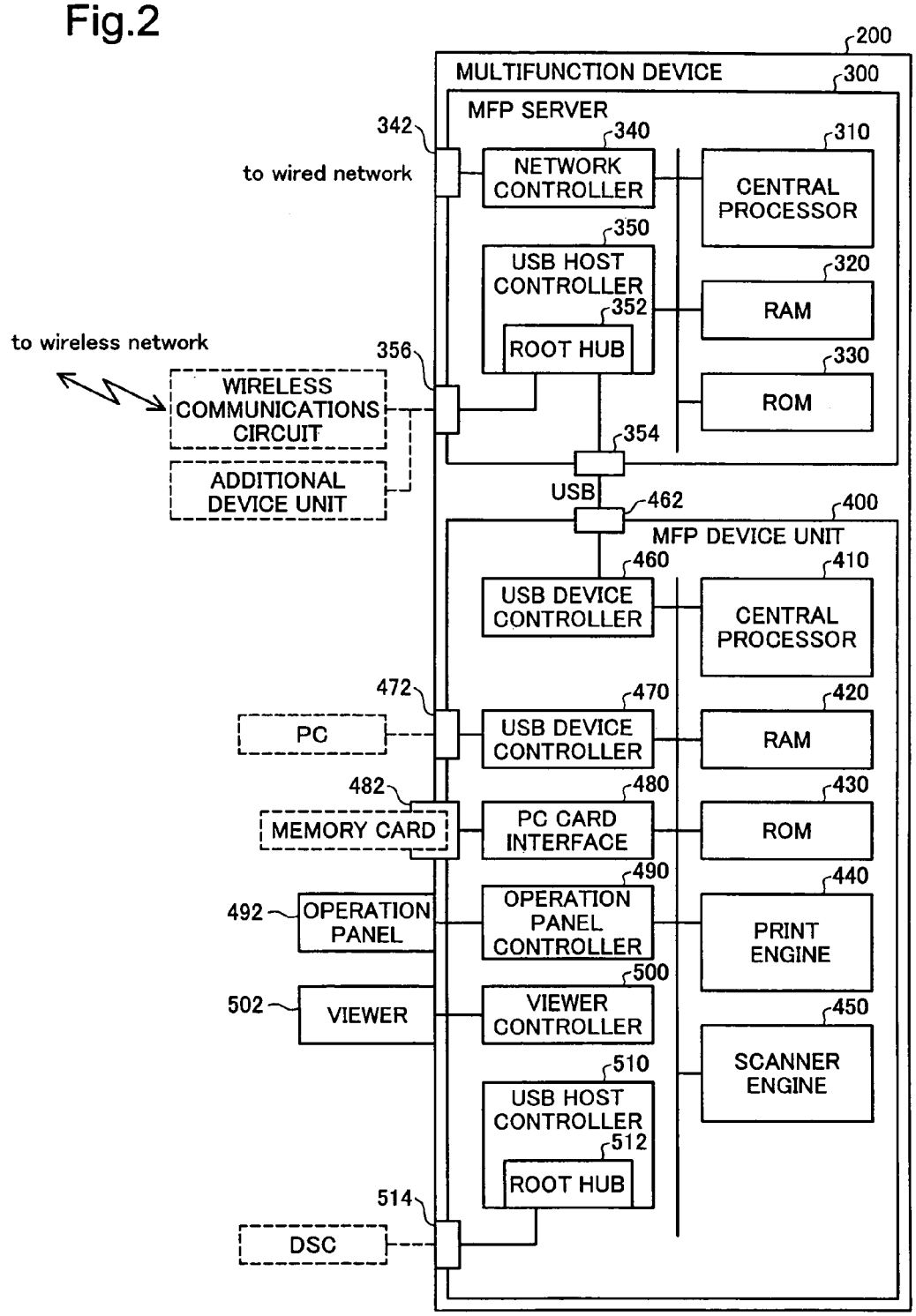
FIG. 2 is a block diagram depicting the internal arrangement of the multifunction device.

FIG. 2 is a block diagram depicting the internal arrangement of the multifunction device 200. The MFP server 300 has a central processor (CPU) 310, RAM 320, ROM 330, a network controller 340, and a USB host controller 350. The network controller 340 is connected to a wired network via a connector 342. The USB host controller 350 has a root hub 352, with two USB connectors 354, 356 provided to the root hub 352. The first USB connector 354 connects via a USB cable to the USB connector 462 of the MFP device unit 400. An additional device (e.g. a wireless communication circuit for communicating with a wireless LAN network, or another device unit) can be connected to the second USB connector 463.

The MFP device unit 400 has a central processor (CPU) 410, RAM 420, ROM 430, a print engine 440, a scanner engine 450, two USB device controllers 460, 470, a PC card interface 480, an operation panel controller 490, a viewer controller 500, and a USB host controller 510.

The print engine 440 is a printing mechanism for executing printing according to print data presented to it. In this embodiment, where the control points 110C, 120C carry out printing on the basis of XHTML data, the central processor 410 interprets the XHTML data, executes color conversion and halftone processing to create print data, and then sends this print data to the print engine 440. However, it would be possible to have an arrangement whereby the print engine 440, rather than the central processor 410, has the color conversion and halftone processing functions. When printing is performed responsive to a print instruction supplied from the personal computer 100, on the other hand, the page description language produced by the printer driver 100D is parsed by the central processor 410 to create print data, which is sent to the print engine 440. "Print data" herein refers to data representing a printout by means of dot data indicating dot forming states on a printing medium. Print data is composed of control commands unique to the printer. XHTML is not a kind of print data in this sense, but it is a document markup language for describing documents.

The scan engine 450 is a mechanism for scanning an image and creating image data. Since the present invention relates to network protocol control and is not affected by the type of service device, in the description hereinbelow the use of the print engine 440 as the device will be described for the most part, while dispensing with description of the use of the scanner engine 450.

The first USB device controller 460 of the MFP device unit 400 connects via the USB connector 462 to the USB host controller 350 of the MFP server 300. The second USB device controller 470 has a USB connector 472; here, it can be connected to any USB host such as a personal computer. The PC card interface 480 has a PC card slot 482. An operation panel 492 serving as input means is connected to the operation panel controller 490. A viewer 502 serving as image display means is connected to the viewer controller 500. The user can input various instructions using the operation panel 492, while viewing images and menus displayed on the viewer 502. The USB host controller 510 has a root hub 512, with a USB connector 514 provided to the root hub 512. A digital camera or other USB device compliant with CIPA DC-001-2003 (a standard of the Camera & Imaging Product Association) or the like can be connected to this connector 514.

The central processor 310, the network controller 340, and the USB host controller 350 of the MFP server 300 function as the network protocol controller 302 in FIG. 1. More specifically, the network controller 340 carries out sending and receiving of messages according to the various network protocols. The central processor 310 parses or interprets the message header according to the UPnP protocol and determines the transfer destination. The USB host controller 350 transfers messages with the MFP device unit 400. These controllers 310, 340, 350 transfer messages without interpreting or processing the message body.

The USB device controller 460 and the central processor 410 of the MFP device unit 400 function as the device controller 402 in FIG. 1. More specifically, the USB device controller 460 carries out sending and receiving of messages according to USB transfer protocol. The central processor 410 interprets the content of messages transferred via the MFP server 300, executes processing in response to the message content, and operates the print engine 440 or the scanner engine 450. The print engine 440 corresponds to the printer 404 of FIG. 1, and the scanner engine 450 corresponds to the scanner 406 of FIG. 1.

Figure 3:
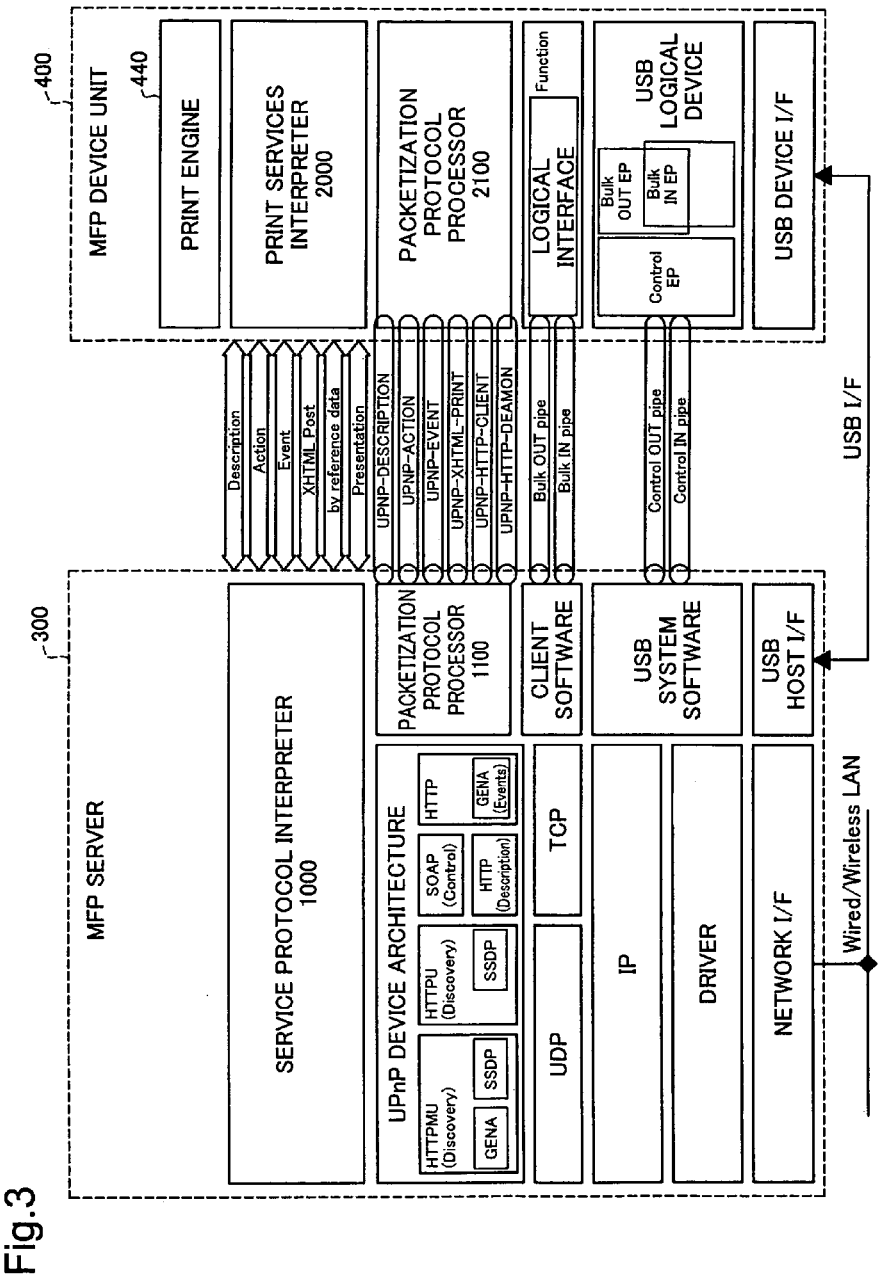
FIG. 3 is a block diagram showing the hierarchical structure of the UPnP architecture-related functions of the MFP server and the MFP device unit.

FIG. 3 is a block diagram showing the hierarchical structure of the UPnP architecture-related functions of the MFP server 300 and the MFP device unit 400. The MFP server 300 comprises a service protocol interpreter 1000 for interpreting or parsing the various network protocols. This service protocol interpreter 1000 functions in a layer above the UPnP device architecture and the USB packetization protocol processor 1100. The structure below the UPnP architecture includes, in order from the bottom, a network interface layer, a driver layer, an Internet Protocol (IP) layer, and a TCP/UDP layer. The structure below the USB packetization protocol processor 1100 includes, in order from the bottom, a USB host interface (hardware), USB system software, and client software.

UPnP architecture is composed according to various protocols such as HTTPMU, HTTPU, SOAP/HTTP, and HTTP. UPnP uses these protocols in accomplishing various processes such as the following.

(1) Addressing:

When a UPnP device (hereinafter referred to simply as a "device") is connected to the network, a network address (IP address) is obtained by means of addressing. A DHCP server or Auto-IP is used for addressing. Where the network is equipped with a DHCP server, the device uses an IP address assigned by the DHCP server. Where there is no DHCP server, the device itself decides on an address, using an automatic IP addressing function called Auto-IP. In this embodiment, only a single IP address is assigned to the multifunction device 200, and the entire multifunction device 200 is recognized as being a single network device.

(2) Discovery (Detection):

Discovery is a process whereby a control point discovers where a device is located. Discovery can be accomplished by means of multicast of a discovery message by the control point, or by advertising to the control point when a device has joined the network. Discovery is carried out using HTTPMU/SSDP or HTTPU/SSDP. As a result of discovery, the control point and the device are able to communicate on a peer-to-peer basis.

(3) Description:

The specifics of the configuration of a device are described in XML by way of a device description. The specifics of the service provided by a device are described in XML by way of a service description. These descriptions are possessed by individual devices and are provided to a control point. The control point, by means of referring to these descriptions, can ascertain the specifics of a device and its service. An example of device description will be discussed later.

(4) Control:

Control is a process whereby a control point transfers to a device a control message that includes an action request, and performs control of the device. Control is carried out using HTTP/SOAP.

(5) Eventing:

When a certain event occurs, a service in the device notifies the control point that an event has occurred. The control point "subscribes" to the service in order to receive notification of events. The event is transferred to the subscribing control point. Eventing is carried out using HTTP/GENA.

(6) Presentation:

Presentation is a process wherein a control point acquires a presentation page described in HTML, from a presentation URL registered in the device description. By means of presentation, the control point can display the state of various devices, for example.

The present invention is applicable to future versions of UPnP as well. The present invention is also applicable to network plug-and-play standards other than UPnP, provided that the network plug-and-play enables peer-to-peer communication between any control point and device by means of addressing (automatic IP address determination) and device discovery, and that the architecture is one in which control points and devices exchange messages.

The MFP device unit 400 comprises a print services interpreter 2000 for interpreting print services message for and executing a process depending on the interpretation result (e.g. starting or canceling a job). The protocol structure below the print services interpreter 2000 includes, in order from the bottom, a USB device interface (hardware), a USB logical device, a logical interface, and a packetization protocol processor 2100. In the example of FIG. 3, there is given an example wherein the print engine 440 is used as the service device, and arrangements relating to the scanner engine 450 are omitted for convenience of illustration.

In FIG. 3, various communication channels between the MFP server 300 and the MFP device unit 400 are portrayed. These depict logical connections among identical layers in the MFP server 300 and the MFP device unit 400. The six bidirectional channels between the service protocol interpreter 1000 and the print services interpreter 2000 are channels for UPnP protocol use. The six channels between the packetization protocol processors 1100, 2100 are logical channels for use in USB transfer. The six logical channels for USB transfer use correspond to the six channels for UPnP protocol use. The following description turns first to the USB transfer channels.

FIGS. 4A and 4B illustrate USB interface/endpoint configuration and logical channel configuration. Typically, a USB device has an interface and endpoints. USB transfers take place between endpoints and a USB host. That is, "endpoints" are a logical resource for communication with a host. In the example of FIG. 4A, five endpoints EP#0-EP#4 are shown. The Control endpoint EP#0 is an endpoint for sending and receiving standard device requests. "Standard device requests" are basic requests that need to be supported by all USB devices. Accordingly, one Control endpoint EP#0 is always provided for one USB device.

The printer BulkOut endpoint EP#1 and the printer BulkIn endpoint EP#2 are endpoints for sending and receiving of messages for use by the print engine 440. Similarly, the scanner BulkOut endpoint EP#3 and the scanner BulkIn endpoint EP#4 are endpoints for sending and receiving of messages for use by the scanner engine 450. Typically, in a USB device, endpoints other than the Control endpoint EP#0 are classified into logical interfaces. In the example of FIG. 4A, a printer interface IF#0 and a scanner interface #1 are provided as logical interfaces.

In this embodiment, as depicted in FIG. 4B, the printer interface IF#0 is provided with eight logical channels. The functions of these channels are as follows.
(1) PRINT-DATA channel CH#11: a channel for sending and receiving print data transferred from the printer driver 100D (FIG. 1) using the Print port (a an LPR port number, or port #9100), from a personal computer 100 on the network. This channel is not shown in FIG. 3.
(2) PRINT-STATUS channel CH#12: a channel for sending and receiving information indicating the status of the print engine 440; the status information is provided from the MFP server 300 to a personal computer 100 on the network by means of a protocol such as SNMP. This channel is not shown in FIG. 3.
(3) UPNP-DESCRIPTION channel #21: a UPnP channel for sending and receiving description.
(4) UPNP-ACTION channel #22: a UPnP channel for sending and receiving actions.
(5) UPNP-EVENT channel #23: a UPnP channel for sending and receiving events.
(6) UPNP-XHTML-PRINT channel #24: a UPnP channel for sending and receiving XHTML data describing a document to be printed.
(7) UPNP-HTTP-CLIENT channel #25: a UPnP channel for sending and receiving messages when acquiring data with reference to a URI of another network device.
(8) UPNP-HTTP-DEAMON channel #26: a UPnP channel for sending and receiving messages when performing presentation.

Each logical channel can perform bidirectional communication utilizing both the BulkOut endpoint EP#1 and the BulkIn endpoint EP#2. Logical channel identifier is registered in the headers of D4 packets described below.

Figure 5:
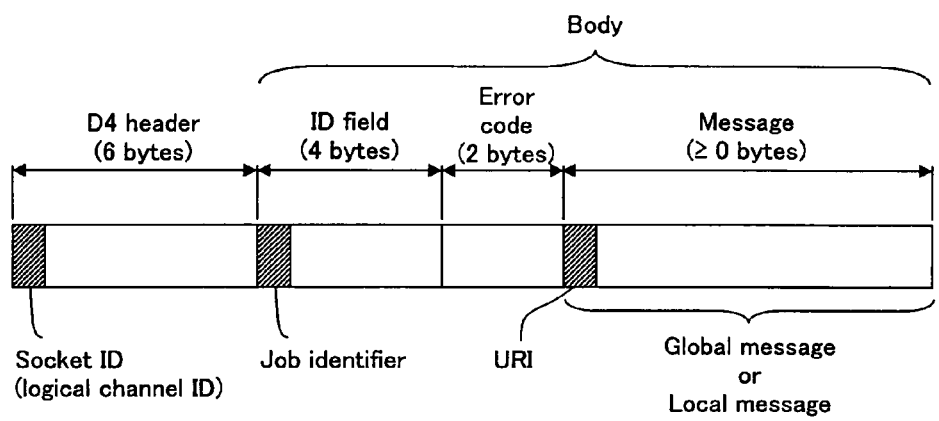
FIG. 5 illustrates the arrangement of a packet used in USB transfers.

FIG. 5 is an illustration depicting the arrangement of a packet used in USB transfers. The packet structure conforms to the IEEE 1284.4 standard, and is termed a "D4 packet." The D4 packet is composed of a 6-byte header and a body; the body is composed of 4-byte ID field, a 2-byte error code field, and a message of zero or more bites. The ID for identifying the eight logical channels depicted in FIG. 4B are registered in the header as a socket ID. As will be discussed later, when there is a print job request from a control point to the multi-function device 200, a job identifier will be set up in the ID field.

Information established in the ID field and error code of each logical channel is as follows.

TABLE 1

| CHANNEL | MFP SERVER → DEVICE | | DEVICE → MFP SERVER | |
|---|---|---|---|---|
| | ID FIELD | ERROR FIELD | ID FIELD | ERROR FIELD |
| UPNP-DE-SCRIPTION | 0 | 0→ | 0 | 0 |
| UPNP-ACTION | 0 | ERROR → CODE | 0 | 0 |
| UPNP-EVENT | 0 | 0 | ←0 | 0 |
| UPNP-XHTML-PRINT | JOB ID | ERROR → CODE | JOB ID | 0 |
| UPNP-HTTP-CLIENT | REQUEST ID | ERROR CODE | ←0 | 0 |
| UPNP-HTTP-DAEMON | 0 | ERROR → CODE | REQUEST ID | 0 |

The arrow in each row of Table 1 indicates the sequence in which communications are carried out in the channel. That is, the base end of an arrow indicates transfer at the time of a request, and the tip of an arrow indicates transfer at the time of a response. For example, in the UPNP-ACTION channel, at the time of a request from the MFP server 300 to the MFP device unit 400, the ID field is normally zero, and if there is an error code, this is set in the error field. An HTTP status code may be set as this error code, for example. At the time of a transfer of a response to this request from the MFP device unit 400 to MFP server 300, the ID field and the error field are both normally set to zero. The "Request ID" used by the UPNP-HTTP-CLIENT channel and the UPNP-HTTP-DAEMON channel are identifiers for identifying individual requests sent over these channels.

Table 1 shows examples of information when either the MFP server 300 or the MFP device unit 400 is on the requesting end, in each logical channel. However, it is possible for each of the logical channels to realize, for a particular purpose, a first operating mode in which the MFP server 300

(network protocol controller 302) is on the requesting end, and a second operating mode in which the MFP device unit 400 (device controller 402) is on the requesting end.

The D4 packets used for USB transfer in this embodiment have two fields—namely an ID field and an error code—within the message body, which fields may be used for sending and receiving specific information between the MFP server 300 and the MFP device unit 400. Accordingly, it is possible to readily distinguish, for example, between a message sent from a client, and specific information for notification between the MFP server 300 and the MFP device unit 400. Specific fields are not limited to the ID filed and error code, it being possible to utilize any specific fields. In preferred practice, the fields will be of fixed length.

In this embodiment, it is possible to transfer both global messages and local messages by means of D4 packets. A "global message" means a message exchanged between a UPnP architecture control point and a device (in this example, the MFP device unit 400). A "local message" means a message exchanged simply between the MFP server 300 and the MFP device unit 400, without any participation by a UPnP architecture control point. Examples of global messages and local messages will be described later. The operating mode in which global messages are exchanged is termed the "global information transfer mode" and the operating mode in which local messages are exchanged is termed the "local information transfer mode."

When a request is sent using the D4 packets of this embodiment, a URI (usually a relative URI) providing notification to the destination or recipient from the message sender is appended to the front end of the message after the error field. From this URI the message recipient can readily determine the content of the request and the final destination. The specific content of the message in the D4 packet will be discussed later.

In this embodiment, the print port logical channels CH#11-CH#12 and the UPnP logical channels CH#21-CH#26 are provided separately as logical channels for USB transfers. Accordingly, print data being transferred to the MFP device unit 400 via a network print port can be readily distinguished from XHTML data being transferred to the MFP device unit 400 via a UPnP port. Additionally, appropriate processing can be readily executed on the print data and the XHTML data respectively, and printing carried out correctly. In this embodiment, since a plurality of logical channels CH#21-CH#26 with different applications are provided for USB transfers of messages by UPnP protocol, it is possible to make the processing of message content a faster process on the message receiving end. The number of logical channels and distinctions thereof employed may be other than those mentioned here. In this embodiment, a logical channel identifier is set as header information in the D4 packet, whereby it is possible to readily identify packets used by different channels.

Figure 6:
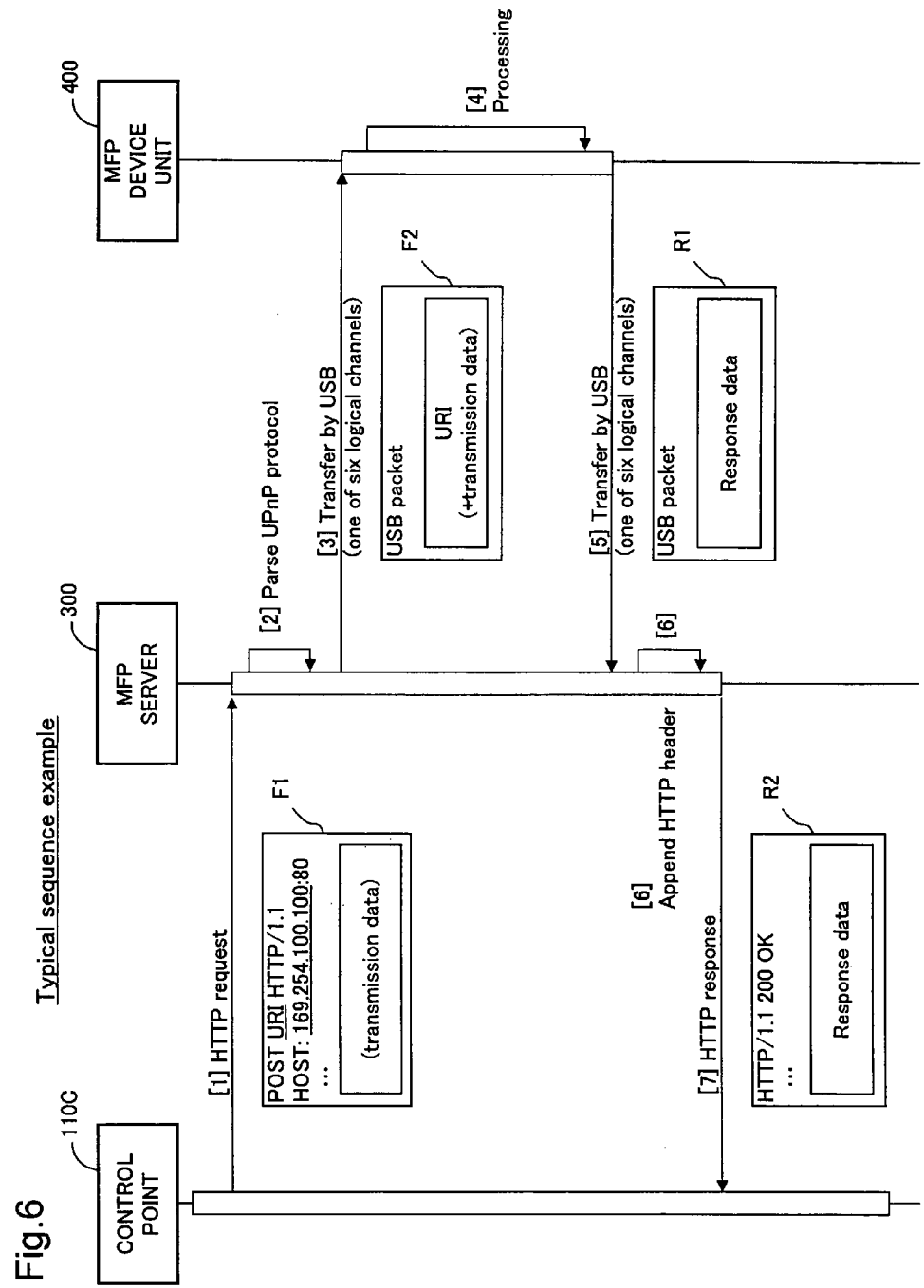
FIG. 6 is a sequence diagram depicting a typical example of a process utilizing UPnP architecture.

FIG. 6 is a sequence diagram depicting a typical example of a process utilizing UPnP architecture. Here, there is depicted an instance of message transfer among the control point 110C, the MFP server 300, and the MFP device unit 400. In Step 1, the control point 110C transfers an HTTP request message F1 to the MFP server 300. It should be noted that the step numbers are enclosed by brackets in the sequence diagram. The header of the message F1 describes a request command (by a method such as POST or GET), the URI of one device or service of the MFP device unit 400, and the IP address of the multifunction device 200; in this example, the IP address is "169.254.100.100." Since the multifunction device 200 is assigned a single IP address, it is possible to think of this IP address as either the IP address of the MFP server 300 or the IP address of the MFP device unit 400.

In Step 2, the MFP server 300 parses the request message F1. Here, on the header of the message F1 is parsed or interpreted; the content of the transmission data (i.e. the message body) is not interpreted. More specifically, in Step 2, the URI of the message F1 is parsed, to determine which device or service within the MFP device unit 400 the transmission data is to be transferred to. In certain instances, however, no transmission data will be present in the request message F1, with only a URI being sent.

In Step 3, the MFP server 300 transfers a message F2 containing a URI and transmission data (where present) to the MFP device unit 400 by USB. During this transfer, one of the six UPnP logical channels mentioned above is selected with reference to the URI.

In Step 4, the MFP device unit 400 executes processing with reference to the URI and transmission data (where present) in the received message F2. This example will be discussed later. In Step 5, the MFP device unit 400 transfers a message R1 including response data to the MFP server 300 by USB. In Step 6, the MFP server 300 appends an HTTP header to the transmission data. This HTTP header includes a status code indicating the result of processing of the HTTP request. For example, where the process result is OK, the status code is set to "200" whereas if there is an error it is set to "500." In Step 7, an HTTP response message R2 created in this way is transferred from the MFP server 300 to the control point 110C.

In this embodiment, the MFP server 300 performs parsing or interpretation of the header in the request message received from the control point, without interpreting the content of the message body, and the content of the message body is interpreted by the MFP device unit 400. This arrangement has advantages such as the following. A first advantage is that the MFP server 300 does not need to ascertain the device configuration and specifics of service of the MFP device unit 400, and can function as a network protocol controller for transferring messages sent to a device unit of any configuration. A second advantage is that even if the device configuration and specifics of service of the MFP device unit 400 are changed, there is no need to modify the configuration or functions of the MFP server 300. A third advantage is that since there is no need to mount an interpreter or parser for interpreting the content of the message body, a simpler configuration for the MFP server 300 will suffice.

C. Multi Function Device Configuration and Device Description

Figure 7A:
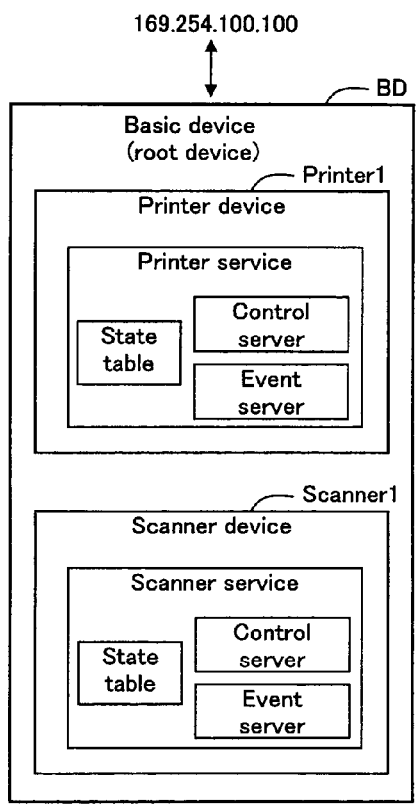
FIGS. 7A and 7B illustrate device configurations in an embodiment and a comparison example.

FIG. 7A is an illustration depicting the device configuration of the multifunction device 200 according to UPnP protocol. The configuration of the multifunction device 200 of this embodiment as a UPnP device has a basic device BD serving as the root device, which includes a printer device "Printer1" and a scanner device "Scanner1". In other words, the printer device Printer1 and the scanner device Scanner1 are nested in the basic device BD. The printer device Printer1 has a printer service, and the scanner device Scanner1 has a scanner service. Each service is composed of a state table, a control server, and an event server. Status variables indicating service status are registered in the state table. The control server receives an action request from the control point and executes a process accordingly. The event server, in the event of a change in the value of a status variable, notifies the control point of the change by way of eventing. The control point targeted for the notification is one that has previously subscribed to the service.

Herein, a device that includes a service is called a "service device." It is possible for a service device to include one or more services. It is also possible for a service device to include another service device (e.g. a memory device).

The basic device BD is constituted as a device that includes one or more service devices, and that itself has no unique services apart from the services executed by the service devices. In this embodiment, the multifunction device 200 is represented by a single basic device BD on the UPnP protocol, which has the advantage that it suffices to assign a single IP address to the multifunction device 200.

Figure 7B:
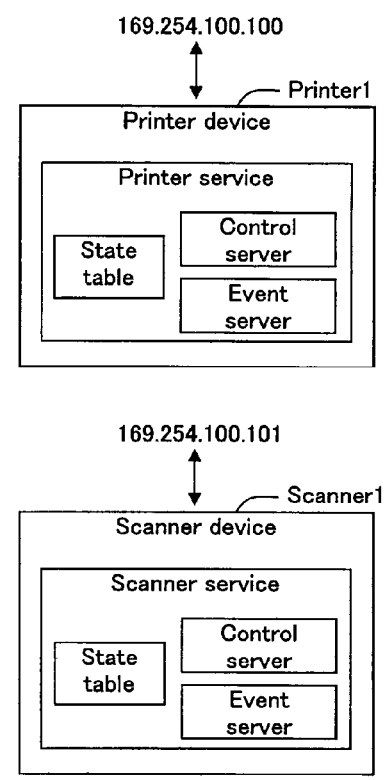

FIG. 7B shows an example of UPnP device configuration in a comparison example. In this comparison example, the printer device Printer1 and the scanner device Scanner1 are constituted as separate UPnP devices. In this case, separate IP addresses are assigned to the printer device Printer1 and the scanner device Scanner1.

As shown in FIG. 7A, in this embodiment, only a single IP address is assigned to the multifunction device 200, which has the advantage that the control point, using this single IP address, can access the various service devices of the multifunction device 200. Another advantage in this embodiment is that since fewer IP addresses are needed as compared to the comparison example, IP address management in the network is simpler.

Each UPnP device stores its own configurational and functional specifics in the form of a device description, and has the function of providing its device description in response to a request from a control point. Service content specifics are stored in the device in the form of a service description, and provided to a control point when requested. In the example of FIG. 7A, a device description of the printer device Printer1, a service description of printer services, a device description of the scanner device Scanner1, and a service description of scanner services are stored in advance in the MFP device unit 400. However, since some of the parameters in device descriptions are dependent on the configuration of the multifunction device 200 (e.g. on the number of service devices), these parameters may be set at the time that the multifunction device 200 is started up.

FIG. 8 is a flowchart showing the procedure of creating a device description at startup of the multifunction device 200. First, when the MFP server 300 and the MFP device unit 400 are started up, the routine moves from Step S1 to Step S2, whereupon the MFP server 300 acquires from the MFP device unit 400 the configuration of the MFP device unit 400 as a USB device. Here, "configuration as a USB device" refers to the interface/endpoint configuration shown in FIG. 4A. The MFP server 300 can recognize one USB interface or logical interface as one service device of UPnP architecture. The MFP server 300 assigns different device identifiers to the individual devices.

Next, when the multifunction device 200 joins the network, the routine moves from Step S3 to Step S4, whereupon the MFP server 300 acquires an IP address by means of the addressing discussed earlier. In Step S5, the MFP server 300 sends the IP address and the device identifier of each device to the MFP device unit 400. In Step S6, the MFP device unit 400, or more specifically MFP server 300, creates a device description using this IP address and device identifiers.

FIG. 9 shows an example of the device description of the multifunction device 200. The device description is described in XML. The underlined sections indicate settings unique to this embodiment. The content of the <URLBase> element, i.e., "169.254.100.100:80" is the IP address of the multifunction device 200 and the port number in the event that HTTP is used. Several URIs or URLs in the description are described as relative addresses to this IP address. Herein, a URI or URL include both instances where described by an absolute address, and instances where described by an relative address.

Below the <root> element there are two <device> elements; as indicated by the <deviceType> element of each device, the first device is a printer and the second device is a scanner.

The content indicated below is described in the Printer description.

<presentation URL>: the URL when a control point acquires the presentation page of the printer device. This URL is composed of IP address "169.254.100.100" of the multifunction device 200, the port number "80", and the printer device identifier "Printer1." The port number may be omitted.

<serviceList>: a service list provided by the printer.

<serviceType>: service type provided by the printer. "PrintBasic" is a basic print service of UPnP architecture.

<SCPDURL>: the URL of the printer device description.

<controlURL>: the URL of the control server in the printer device. The "control server" is a server that provides a control point with the function of control (a process wherein the control point transfers to a device a control message including an action request, and performs control of the device), and is typically provided within the service of a UPnP device. The control server URL is composed of the printer device identifier and the server name "control."

<eventSubURL>: the URL of the event server in the printer device. The "event server" is a server for issuing events to a subscribing control point; it is typically provided within the device service. The event server URL is composed of the printer device identifier and the server name "event."

Among the contents or parameters of the elements mentioned above, the IP address "169.254.100.100" and the printer device identifier "Printer1" are established with reference to values sent from the MFP server 300 to the MFP device unit 400 in Step S5 of FIG. 8.

The scanner device description also describes items substantially similar to that of the printer. While the device descriptions additionally describe device friendly name, manufacture name, model, icons and various other properties, these have been omitted here.

FIG. 10 depicts the sequence of device description acquisition by a control point. In Step 1, the control point 110C issues a device description request message F11 to the MFP server 300. This message F11 includes the URI "/DevDesc.xml" and IP address "169.254.100.100" of the multifunction device 200. The URI "/DevDesc.xml" indicating the device description is derived from the URL for description of the root device of which the control point is notified by the device in UPnP discovery.

In Step 2, the MFP server 300 parses the UPnP protocol of the request message F11, and in Step 3 a message F12 that includes the request destination URI "/DevDesc.xml" is transferred to the MFP device unit 400. This transfer is carried out using the USB UPNP-DESCRIPTION channel.

In Step 4, the MFP device unit 400 interprets the contents of the received message F12, and determines that device description has been requested. In Step 5, the MFP device unit 400 transfers a message R11 that includes the device description to the MFP server 300 by USB. In the front end portion of the message are established a field "RE" indicating the request result, and a field "HR" indicating the HTTP result. Where the request is successful the value of the RE field is set to "0000", or if it fails to a value other than "0000." Where the process result is OK the value of the HR field is set to "200" or in the event of an error is set to "500." The HTTP status code can be used as-is as the value of the HR field.

In Step 6, the MFP server 300 appends an HTTP header to the transmission data. This HTTP header includes the status code indicating the process result of the HTTP request. In Step 7, the HTTP response message created in this way is transferred from the MFP server 300 to the control point 110C.

In this embodiment, since the device configuration is made such that service devices are nested in a single basic device BD, a resultant advantage is that it is easy to create a device description. This advantage is particularly notable in case where the number or type of service devices changes. Specifically, even where a multifunction device includes various different kinds of service devices, since all of the service devices may be nested in the basic device BD, it is possible to readily create a device description.

The above discussion of FIG. 10 describes the MFP device unit 400 as creating an overall device description (FIG. 9) for the multifunction device 200, but it would be acceptable instead for the MFP server 300 to create this overall device description. In this case, the MFP server 300 may receive from each device a device description of the individual device (in the case of FIG. 9, two device descriptions, one for printer use and one for scanner use), and utilize these to create the overall device description. Creation of the overall device description may be executed in the event of a request from a control point as depicted in FIG. 10, or the overall device description may be created in advance in held in the MFP server 300.

As shown in FIG. 2, it is possible to connect an additional MFP device unit to the USB terminal 356 of the multifunction device 200. In the event that this additional MFP device unit is connected, the device configuration of the multifunction device 200 will be reconfigured.

Figure 11:
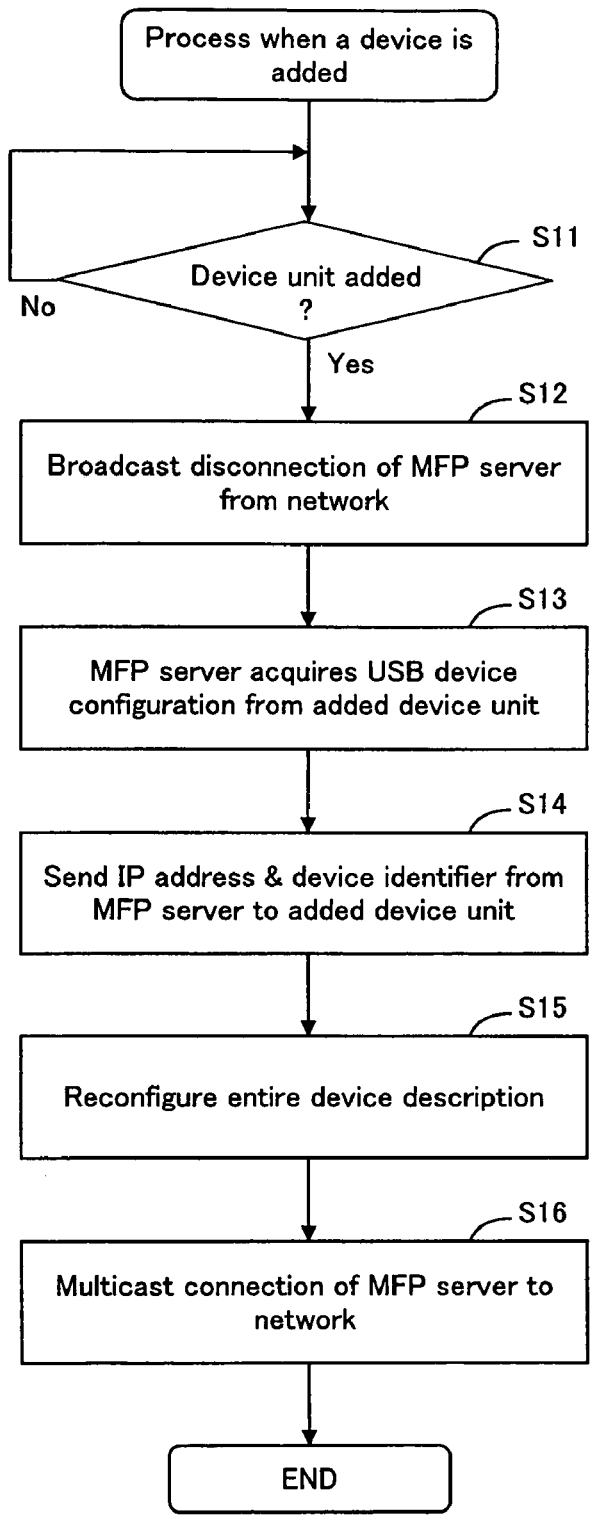
FIG. 11 is a flowchart showing the device configuration reconfiguration process when a device unit has been added.

FIG. 11 is a flowchart showing the device configuration reconfiguration process when a device unit has been added. When the device unit is added in Step S11, in Step S12, the MFP server 300 broadcasts the fact that the MFP server 300 will disconnect from the network (advertisement of quitting). In Step S13, the MFP server 300 acquires the USB device configuration (interface/endpoint configuration) from the additional unit. In Step S14, an IP address and a device identifier are sent to the additional device unit from the MFP server 300. In Step S15, an overall device description of the multifunction device 200 is recreated using this IP address and device identifier. In Step S16, the MFP server 300 multicasts the fact that it has connected to the network (advertisement of connection). Discovery commences from this advertisement of connection, and the multifunction device 200 is detected by the control points.

Figure 12:
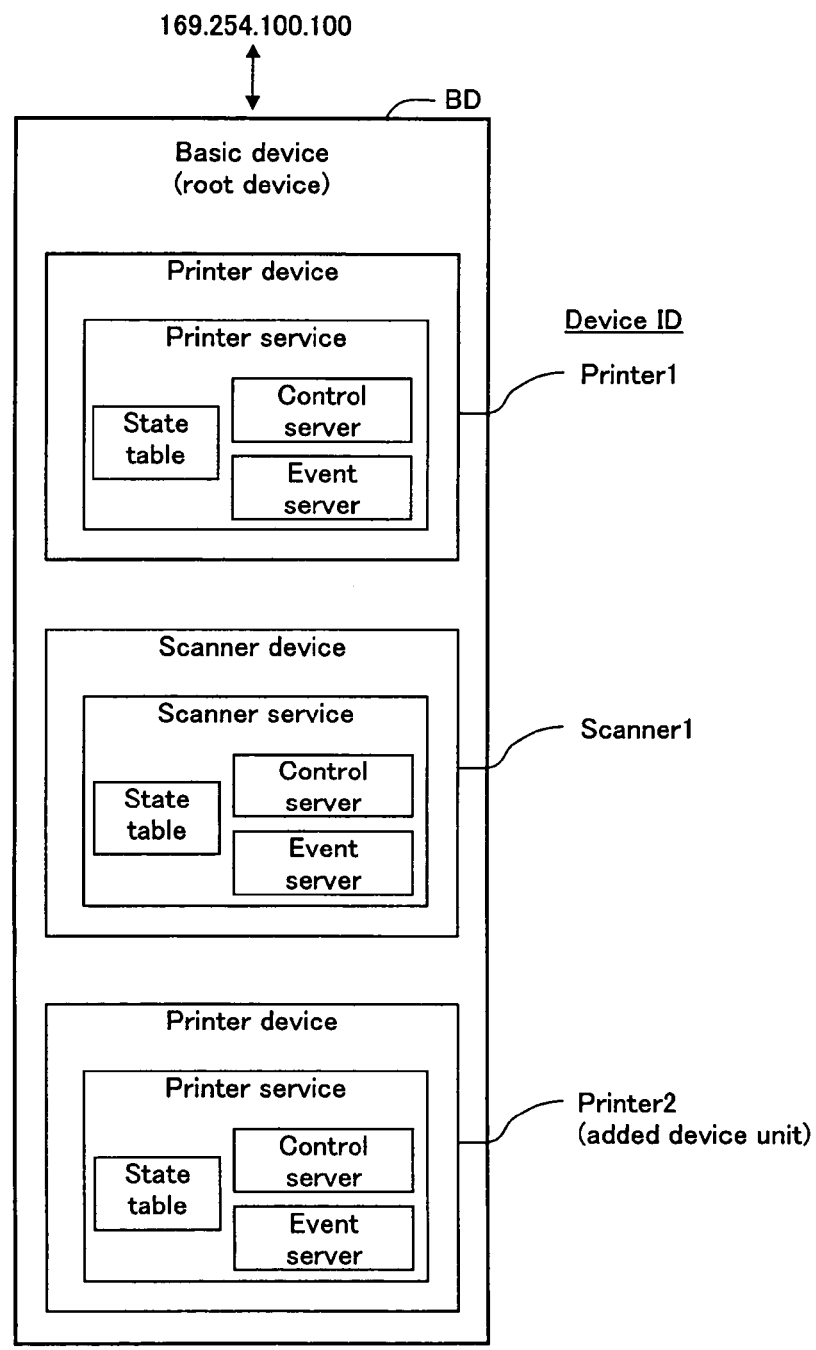
FIG. 12 illustrates the UPnP device configuration of the multifunction device when an MFP device unit has been added.

FIG. 12 is an illustration depicting the UPnP device configuration of the multifunction device 200 when an MFP device unit has been added. Here, the additional device unit is assumed to have a printer device only. As will be understood from comparison with FIG. 7A, the additional printer device is nested in the basic device BD, as a lower level device of the basic device BD. This additional printer device is assigned a device identifier "Printer2" different from the device identifier "Printer1" of the printer device of the MFP device unit 400. In the event that some other type of service device (e.g. an external memory device) is connected as an additional device unit, the device identifier will be assigned depending on the type of device.

While not shown in the drawings, a device description of the second printer is added to the overall device description of the multifunction device 200, after the scanner description of the device description depicted in FIG. 9.

Where the MFP server 300 has been configured so as to allow addition of such a device unit, it is preferable for the MFP server 300 to create the overall device description of the multifunction device 200. The reason is that the MFP device unit 400 does not know whether another device unit is connected to the MFP server 300. Accordingly, in preferred practice the MFP server 300 will acquire device descriptions from each device unit, and create and store an overall device description of the multifunction device 200 like that depicted in FIG. 9. In this case, in the sequence given in FIG. 10, the MFP server 300 can send back the stored device description to the control point 110C, without performing Steps 3-5.

As shown in FIG. 9, device descriptions of individual devices transferred from the device units to the MFP server 300 have an IP address and device identifier embedded therein. Accordingly the MFP server 300 can prepare a template like the device description depicted in FIG. 9 but which does not include any descriptions of individual devices (service devices), and then embed in the template the device descriptions transferred from the devices, to create an overall device description of the multifunction device 200.

From a state in which several device units are connected to the MFP server 300, when one of the device units is disconnected, the device configuration and device descriptions will be reconfigured by a procedure like that in FIG. 11.

In this way, various devices units can be connected to and disconnected from the MFP server 300 of this embodiment, and an overall device description of the multifunction device 200 can be adaptively created with reference to the type and number of device units actually connected to the MFP server 300. Accordingly, it is possible to easily realize various device configurations for the UPnP compliant multifunction device 200.

D. Print Job Execution Sequence

FIG. 13 and FIG. 14 are sequence diagrams depicting the procedure by which the multifunction device 200 executes printing in response to a request from a control point. In Step 1 in FIG. 13, the control point 110C transfers a request message F21 requesting creation of a print job to the MFP server 300. As shown in FIG. 15, the header of this request message F21 describes the printer device control URI "/Printer1/Control" and IP address "169.254.100.100" of the multifunction device 200. In the SOAPACTION header there are established the text string "PrintBasic" indicating the UPnP service type, and the text string "CreateJob" indicating that the command is one to create a print job. SOAP data (also termed "SOAP message") is appended to the end of the HTTP header. Text strings indicating service type and type of command are established in the SOAP envelope as well. The SOAP envelope corresponds to the body of the message F21. In the message F21 of FIG. 15, the underlined section are sections specific to this message F21.

In the CreateJob command to create a print job, it is possible to establish printing parameters such as the following, by way of job attributes.
 number of copies
 layout (1 page/sheet, 2 pages/sheet, device settings etc.)
 paper direction (portrait/landscape, device settings etc.)
 paper size (A4, B3, device settings etc.)
 paper type (plain paper, photo paper, transparency, envelope, device settings etc.)
 print quality (low, normal, high, device settings etc.)

Here, the "device settings" refer to the use of settings made in the multifunction device 200. Since various printing parameters can be established in the CreateJob command, the user operating the control point can make the multifunction device 200 execute printing with the desired printing parameters.

In Step 2 of FIG. 13, the MFP server 300 parses the UPnP protocol of the request message F21. As a result of this parsing, it is recognized that this message F21 is intended for transfer to the control server of the printer device; it is further recognized that it is a job creation request, and a job identifier JobId is assigned. Since each print job is assigned a unique identifier, the multifunction device 200 can receive multiple print jobs in parallel, and execute a printing process of each.

In Step 3, the MFP server 300 transfers to the MFP device unit 400 a message F22 containing the control URL of the printer device and SOAP data. As shown in FIG. 15, this message F22 is an identical copy of the SOAP data sent from the control point, with the control URL "/Printer1/control" appended to its head. The job identifier is set in the ID field of the USB packet (see FIG. 5). The UPNP-ACTION channel is used for the transfer.

In Step 4 of FIG. 13, the MFP device unit 400 parses the SOAP action in the received message F22, and executes processing in response to the SOAP action. Here, since the SOAP action is a job creation request, there is created SOAP data for response, in which is established the delivery destination URI of the document data (XHTML data) representing the document to be printed. In Step 5, the MFP device unit 400 transfers by USB to the MFP server 300 a message R21 including this SOAP data. As shown in FIG. 15, this message R21 is composed of an RE field indicating the result of the request, an HR field indicating the HTTP result, and SOAP data (SOAP envelope). In this example, the request of the print job creation is successful, and "0000" is set in the RE field, and "200" is set in the HR field accordingly. If the request had failed, other predetermined values will be set instead. The SOAP data is a SOAP envelope that contains the text string "CreateJobResponse" indicating that it is a response to a job creation command. In this SOAP envelope are embedded the XHTML data delivery destination URI "/Printer1/DataSink/00000003" and the job identifier "3." The job identifier "3" used here is that supplied by the MFP server 300 in Step 3. In this embodiment, the tail end of the XHTML data delivery destination URI is set to an 8-digit hexadecimal value having the same value as the job identifier.

In Step 6, the MFP server 300 parses the HR field of the message R21 and appends an HTTP header to the SOAP data. In Step 7, the HTTP response message R22 created in this way is transferred from the MFP server 300 to the control point 110C.

In Step 8 of FIG. 14, the control point 110C sends a request message F31 for sending XHTML data to the XHTML data delivery destination URI "/Printer1/DataSink/00000003."

The XHTML data includes text and images laid out in accordance with the XHTML specification.

Image data included in the XHTML data can be embedded in the XHTML data in the format according to the RFC3391 of the Internet Engineering Task Force. It is also possible to establish a reference URI for acquiring an image from the image server 130 (FIG. 1) instead.

In Step 9, the MFP server 300 parses the UPnP protocol for the request message F31. As a result of this parsing, it is recognized that the message F31 is destined for the URI "/Printer1/DataSink/00000003", and from the end of the URI the job identifier value "3" is extracted.

In Step 10, the MFP server 300 transfers to the MFP device unit 400 the message F32 including the XHTML data delivery destination URL "/Printer1/DataSink/00000003" and the XHTML data. The job identifier is set in the ID field of the USB packet (see FIG. 5). The UPNP-XHTML-PRINT channel is used for the transfer.

In Step 11 of FIG. 14, the MFP device unit 400 parses the XHTML data in the received message F32, and executes printing. Where a reference URI for acquiring an image has been established in the XHTML data, the MFP device unit 400 refers to this reference URI and acquires the image data from the image server 130. During this acquisition, the USB UPNP-HTTP-CLIENT channel (FIG. 3) is used.

In Step 12, the MFP device unit 400 transfers to the MFP server 300 by USB a message R31 that includes a job identifier, an RE field indicating the result of the request, and an HR field. The job identifier is embedded in the ID field of the USB packet.

In Step 13, the MFP server 300 parses the HR field of the message R31, and establishes the value thereof as the status code of the HTTP header. In Step 14, the HTTP response message R32 created in this way is transferred from the MFP server 300 to the control point 110C.

In this way, in the print job execution sequence, the content of XHTML data indicating a document for printing is parsed by the MFP device unit 400, without being parsed by the MFP server 300. An accordant advantage is that there is no need to mount an XHTML parser from the MFP server 300.

Assuming that an XHTML parser is implemented within the MFP server 300 to parse XHTML data, it becomes necessary for the MFP server 300 to ascertain whether the MFP device unit 400 is compatible with the printing parameters (especially printing paper type and size) included in the XHTML data. In this embodiment, by contrast, there is no need for the MFP server 300 to ascertain whether printing parameters are ones with which the MFP device unit 400 is compatible, which has the advantage of making it easier to implement the MFP server 300.

E. Action Execution Sequence

As actions transferred using the USB UPNP-ACTION channel (FIG. 4), there two kinds of action, namely global action and local action, as discussed below.

Figure 16:
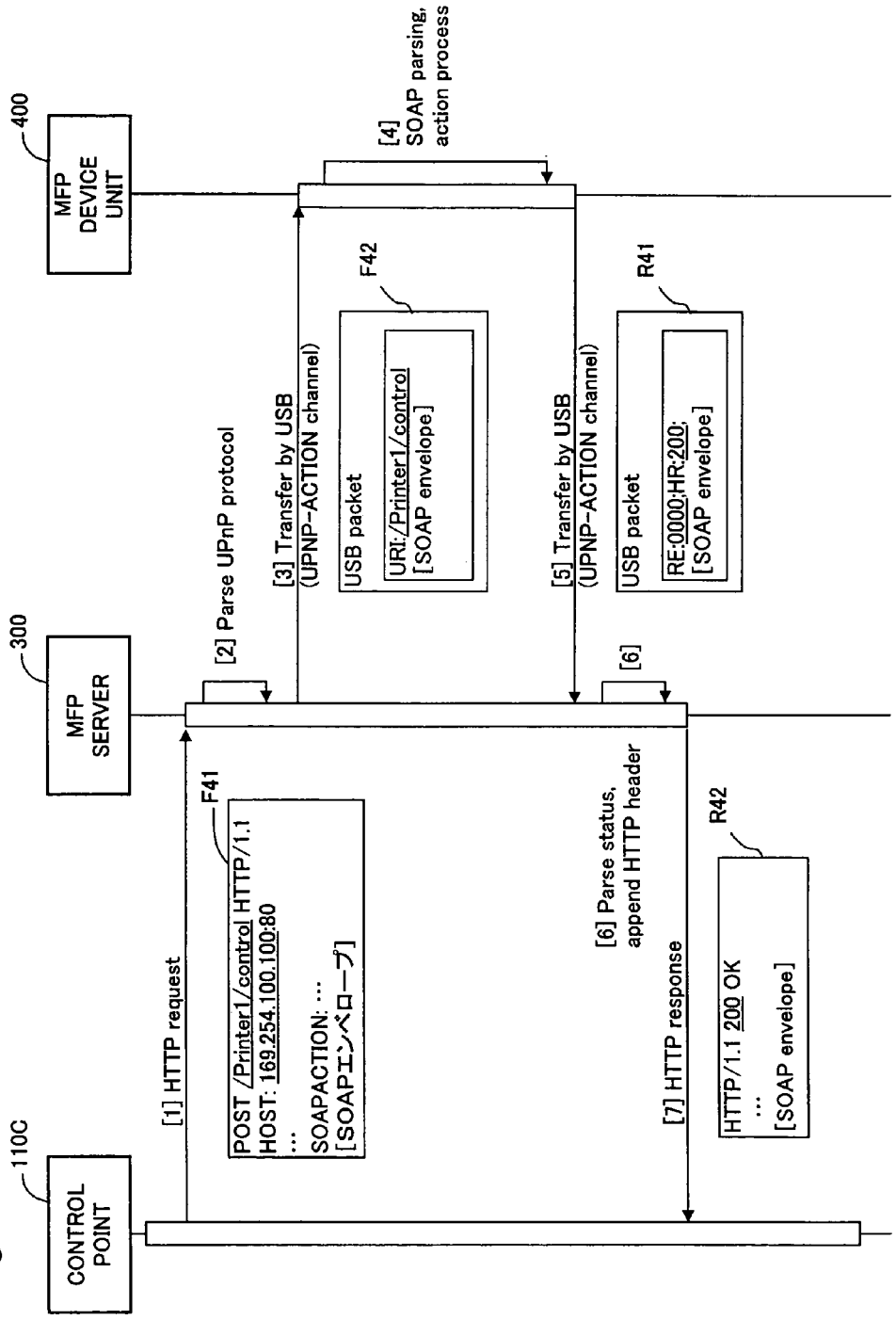
FIG. 16 is a sequence diagram depicting a global action execution procedure.

FIG. 16 is an example depiction of a global action execution sequence. Here, a case in which the print job started in FIG. 13 is to be cancelled is depicted. Creation of the print job described in Steps 1-7 of FIG. 13 is also a kind of global action.

In Step 1 of FIG. 16, the control point 110C transfers to the MFP server 300 a request message F41 requesting that the print job be cancelled. As shown in FIG. 17, the printer device control URI "Printer1/Control" and IP address "169.254.100.100" of the multifunction device 200 are described in the header of this request message F41. In the SOAPACTION header of the message F41 there are established the text string "PrintBasic" indicating UPnP service type, and the text string "CancelJob" indicating that the command is one to cancel the print job. These text strings are also set within the SOAP envelope as well. A job identifier value of "3" is set for the job to be canceled.

In Step 2 of FIG. 16, the MFP server 300 parses the HTTP header for the request message F41, recognizes the control URI "Printer1/Control" which is the destination of the message F41, and recognizes that the content of the action is a request to cancel a print job.

In Step 3, the MFP server 300 transfers to the MFP device unit 400 by USB a message F42 that includes the printer device control URI "Printer1/Control" and SOAP data. As shown in FIG. 17, this message F42 is an identical copy of the SOAP data sent from the control point, with the control URI appended to its head. The UPNP-ACTION channel is used for the transfer.

In Step 4 of FIG. 16, the MFP device unit 400 parses the SOAP action in the received message F42, and executes processing in response to the SOAP action. Here, since the SOAP action is a job cancel request, the print job whose job identifier is "3" is canceled. In Step 5, the MFP device unit 400 transfers by USB to the MFP server 300 a message R41 including response SOAP data. As shown in FIG. 17, this message R41 is composed of an RE field indicating the result of the request, an RE field indicating the HTTP result, and SOAP data. The SOAP data is a SOAP envelope that contains the text string "CancelJobResponse" indicating that it is a response to a job creation command.

In Step 6, the MFP server 300 parses the HR field of the message R41 and appends an HTTP header to the SOAP data. In Step 7, the HTTP response message R42 created in this way is transferred from the MFP server 300 to the control point 110C.

As can be appreciated from the above example, SOAP data is typically used for action requests from control points to devices and for responses thereto.

FIG. 18 is an example depiction of a local action execution sequence. With local actions, messages are exchanged between the MFP server 300 and the MFP device unit 400 only, without the participation of the control point 110C. In Step 1, the MFP server 300 transfers by USB to the MFP device unit 400 a local action message F51. As shown in FIG. 19, it contains the printer device control URI "/Local/control" and SOAP data. The text string "/Local/control" in the message header indicates that it is a local action. "X_GetInfo" is established as a local information acquisition command in the SOAP envelope. It is possible for local action commands to be defined arbitrarily on a device-by-device basis.

This message F51 is similar to the message F42 (FIG. 17) that is transferred by USB from the MFP server 300 to the MFP device unit 400 during a global action. However, a difference is that whereas the global action message F42 includes a URI "/Printer1/control" in the header, the local action message F52 includes a different URI "/Local/control" in the header. Accordingly, the printer device of the MFP device unit 400 can distinguish between a global action and local action, depending on the message header.

In Step 2 of FIG. 18, the MFP device unit 400 parses the SOAP action in the received message F51, and executes processing in response to the SOAP action. Here, since the SOAP action is an information acquisition request, there is created SOAP data which contains certain information of the MFP device unit 400. In Step 3, the MFP device unit 400 transfers a message R51 including SOAP data for response, to the MFP server 300 by USB. As shown in FIG. 19, this message R51 is composed of an RE field indicating the result of the request, and SOAP data. In the local action response message R51, no HR field indicating HTTP result is established, in which respect it differs from the global action response message R41 (FIG. 17).

Upon receiving the message R51, the MFP server 300 parses the RE field and determines that the local action has been successful. Since this message R51 does not include an HR field, no response is sent to a control point.

In this way, between the MFP server 300 and the MFP device unit 400, there can be exchanged global messages F42, R41 (FIG. 17), and it is also possible to exchange local messages F51, R51 (FIG. 19). As noted, since it can be discerned from the header at the start of the message F51 transferred from the MFP server 300 to the MFP device unit 400 whether it is a global message exchange or a local message exchange, it is possible for the MFP device unit 400 to readily distinguish between the two.

F. Eventing Sequence

FIG. 20 depicts an example of the sequence when an event has occurred. As shown in FIG. 7A, an event server and a state table are provided in UPnP device services. The state table is a table for storing status variables indicating various states of the service. An "event" denotes a change in a value of the state table (a status variable). When a value in the state table changes, the event server notifies the control point subscribing to the service that an event has occurred.

Figure 21:
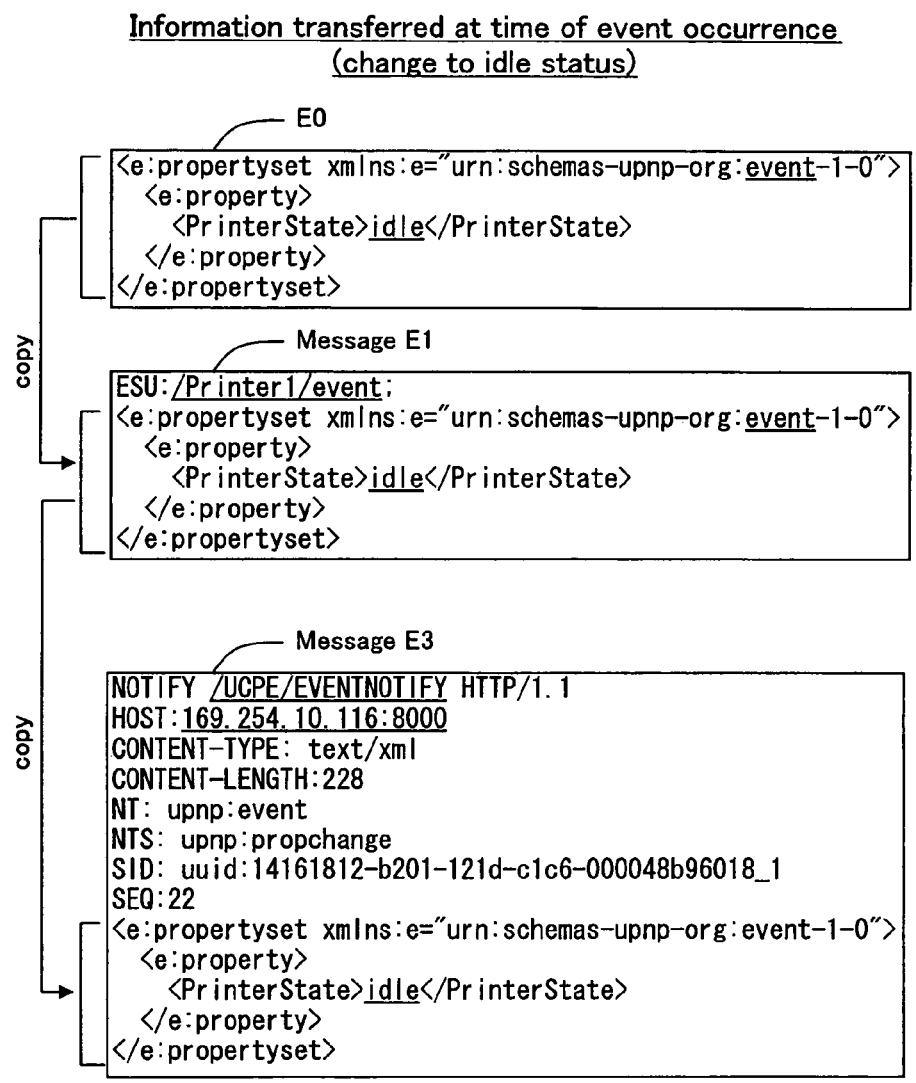
FIG. 21 illustrates an example of a message when an event has occurred.

When an event occurs, first, in Step 1 in FIG. 20, the MFP device unit 400 creates XML data E0 describing the event which occurred (hereinafter termed "status variable XML data"). As shown in FIG. 21, an "event" attribute indicating occurrence of an event is established in the <e:propertyset> tag at the head of the status variable XML data E0. As the status variable, there has been set the text string "idle" indicating that the <PrinterState> has changed to idle. Here, it is assumed that the printer service status variable has changed from "processing" to "idle."

In Step 2, the MFP device unit 400 transfers an event occurrence message E1 to the MFP server 300 by USB. As shown in FIG. 21, this message E1 has the header "ESU:/Printer1/event:" indicating an event in the printer device Printer1, appended to the front of the original status variable XML data E0. The USB UPNP-EVENT channel is used for this transfer.

In Step 3 in FIG. 20, the MFP server 300 transfers to the MFP device unit 400 by USB a response message E2 indicating that the message E1 has been received normally. This response message E2 includes a response field.

In Step 4, the MFP server 300 appends an HTTP header to the message E2 received in Step 2, and creates a message E3 to the control point. As shown in FIG. 21, the HTTP header of this message E3 includes the relative URL "/UCPE/EVENT-NOTIFY" of the event destination, and the IP address "169.254.10.116:8000" of the control point which is the destination for the event. The port number "8000" is a value pre-established for the purpose of event notification.

When the control point 110C receives the message E3, in Step 6 it sends back an HTTP response message E4 to the MFP server 300.

In this way, event when an event occurs, the MFP server 300 simply transfers the message, without parsing or interpreting the content of the message. Accordingly, it is possible to employ a simple configuration for the MFP server 300.

G. Embodiment 2

Figure 22:
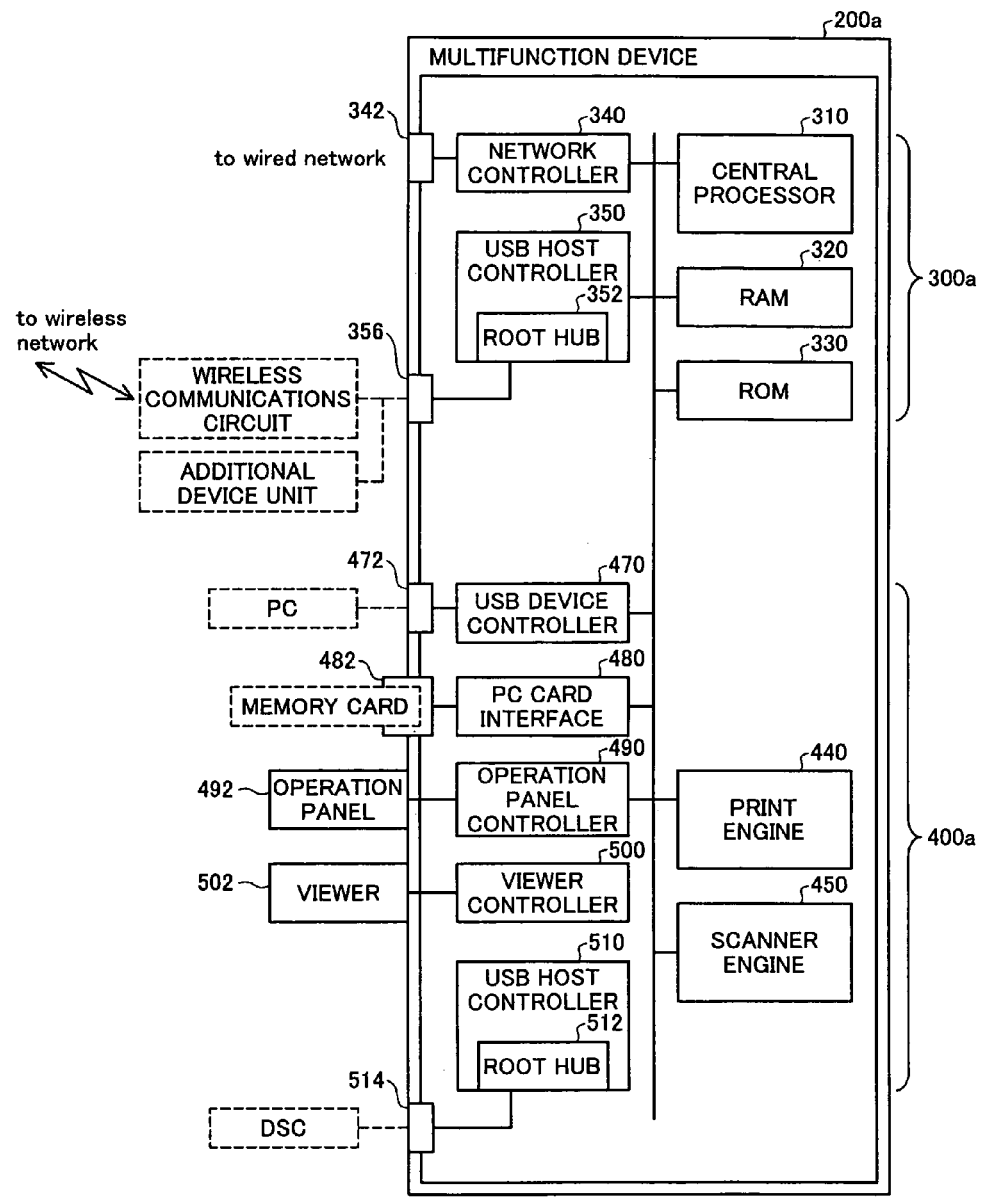
FIG. 22 is a block diagram showing the internal configuration of the multifunction device in Embodiment 2.

FIG. 22 is a block diagram showing the internal configuration of a multifunction device 200a in Embodiment 2 of the invention. A difference from the multifunction device 200 of Embodiment 1 depicted in FIG. 2 is that the MFP server 300 and the MFP device unit 400 are connected not by USB, the two being connected by a bus instead. In association with this, in Embodiment 2 the USB parts for connecting the two (the connectors 354, 452 and the USB device controller 460) are omitted. However, the USB host controller remains for the purpose of connecting to other devices (a wireless communications circuit or additional device unit). In Embodiment 2, the central processor 310, RAM 320, and ROM 330 are shared by the MFP server 300*a* and the MFP device unit 400*a*. Accordingly, the central processor 310 executes both a program for realizing the control functions of the MFP server 300*a*, and a program for realizing the control functions of the MFP device unit 400*a*. Other hardware configurations of Embodiment 2 are the same as Embodiment 1.

Figure 23:
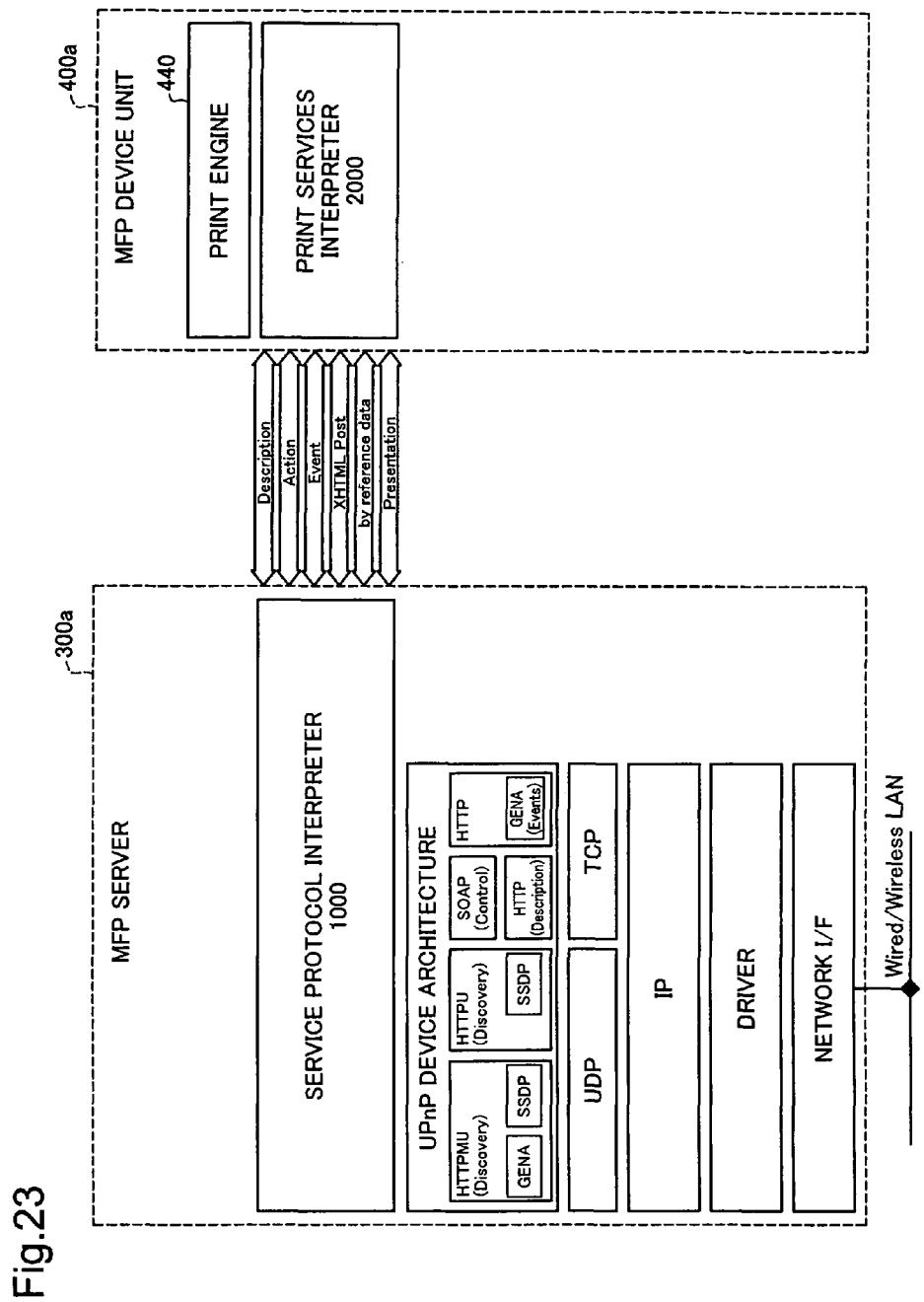
FIG. 23 is a block diagram showing the hierarchical structure of the UPnP architecture-related functions of the MFP server and the MFP device unit in Embodiment 2.

FIG. 23 is a block diagram showing the hierarchical structure of the UPnP architecture-related functions of the MFP server 300*a* and the MFP device unit 400*a* in Embodiment 2. As can be appreciated from comparison with the structure of Embodiment 1 shown in FIG. 3, the layer for USB transfers is omitted in Embodiment 2. However, the six bidirectional logical channels between the MFP device unit 400*a* and the print services interpreter 2000 are the same as in Embodiment 1. In Embodiment 2, the control functions of the MFP server 300*a* and the control functions of the MFP device unit 400*a* are realized as different processes executed by the same central processor (CPU) 310. Accordingly, exchange of messages between the MFP server 300*a* and the MFP device unit 400*a* is carried out by message exchange between processes, not USB transfers.

As will be understood from Embodiments 1 and 2, message exchange between the MFP server 300 and the MFP device unit 400 is carried out by means of a communication protocol different from the UPnP protocol.

In Embodiment 2, in the same way as in Embodiment 1, the MFP server 300*a* functions as the network protocol controller 302 (FIG. 1) for mediating messages exchanged between the MFP device unit 400*a* and other devices on the LAN. An accordant advantage is that the MFP server 300*a* can be configured simply, without being dependent on the configuration of the MFP device unit 400*a*.

H. Variation Examples

The invention is not limited to the embodiments discussed above, and may be reduced to practice in various other forms without departing from the spirit thereof; the following variations are possible, for example.

H1. Variation Example 1

In the embodiments discussed previously, a multifunction device 200 that includes multiple devices is used as the UPnP compliant network device; however, it would be possible to employ a single function network device that includes only a single device (e.g. a printer). In other words, it is acceptable for the network device to have at least one service device. In the preceding embodiments, only one MFP device unit 400*a* is connected to the MFP server 300 at the time of startup, but two or more device units could be connected at startup.

H2. Variation Example 2

Whereas in the preceding embodiments, XHTML is used as the language for describing documents to be printed, it would be possible to use a document markup language other than XHTML.

H3. Variation Example 3

Whereas the preceding embodiments mainly relate to a printing device having print services, the embodiments are also applicable to devices that provide any other services. For example, it is be applicable to devices that provide content directory services, for example. A "content directory service" is a service that provides content such as still images, video, music or the like.

H4. Variation Example 4

Some of the arrangements realized through hardware in the preceding embodiments may instead be replaced by software, and conversely some of the arrangements realized through software may be replaced by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A Universal Plug and Play (UPnP) compliant network device, comprising:
   a plurality of service devices configured to execute a service in response to a request from a client on a network;
   a single device controller configured to control the plurality of service devices; and
   a network protocol controller configured to operate on a message in accordance with both a UPnP protocol and a communications protocol different from the UPnP protocol and configured to receive from a client on the network a message having a message header and a message body, and to transfer content of the message body to the device controller, wherein the network protocol controller has a single IP address that is commonly used as an IP address of the plurality of service devices, each of the service devices not having an unique IP address,
   wherein the network protocol controller interprets the message header according to the UPnP protocol without interpreting the content of the message body received from the client, and transmits the message body to the device controller according to the communications protocol different from the UPnP protocol, and
   the device controller interprets the content of the message body received from the network protocol controller, and causes one or more of the plurality of service devices to execute a service according to a result of the interpretation.

2. The UPnP complaint network device according to claim 1, wherein
   the network protocol controller is capable of designating a message received from the device controller as the message body, appending a message header to the message body to thereby produce a second message, and transmitting the second message to the client on the network;
   the device controller transmits to the network protocol controller a message intended for transmission to the client according to the communications protocol different from the UPnP protocol; and
   the network protocol controller appends the message header according to the UPnP protocol without interpreting content of the message body received from the device controller to thereby produce the second message composed of the message header and the message body, and transmits the second message to the client.

3. The UPnP complaint network device according to claim 1, wherein the UPnP complaint network device operates as a single network device assigned a single IP address; and
   individual service devices are identified by means of the IP address of the UPnP complaint network device and device identifiers assigned to respective service devices.

4. The UPnP complaint network device according to claim 3, wherein the UPnP complaint network device has a device configuration in accordance with the UPnP architecture, wherein the device configuration is a nested configuration having the service devices included within a single basic device representing the UPnP complaint network device.

5. The UPnP complaint network device according to claim 4, wherein a basic device is configured as a device that has no unique services executed by the basic device per se, apart from the services executed by the service devices.

6. The UPnP complaint network device according to claim 3, wherein
the UPnP complaint network device is capable of operating as a first device compliant with the UPnP protocol, and operating as a second device compliant with a network protocol other than the UPnP protocol,
the UPnP complaint network device is accessed by means of a predetermined first port number when operating as the first device, and accessed by means of a second port number different from the first port number when operating as the second device.

7. The UPnP complaint network device according to claim 6, wherein
the service device includes a printing mechanism,
the first device is a first printer compliant with the UPnP protocol, and
the second device is a second printer compliant with a network protocol other than the UPnP protocol,
and wherein the device controller:
(i) when the UPnP complaint network device is operating as the first printer, receives from the client on the network a message body that includes text markup language, interprets the text markup language to create print data representing dot forming states, and presents the created print data to the printing mechanism; and
(ii) when the UPnP complaint network device is operating as the second printer, receives from the client on the network print data including a control command unique to the second printer, and presents the print data to the printing mechanism.

8. The UPnP complaint network device according to claim 7 wherein communication between the network protocol controller and the device controller is executed by means of packet communication using a logical channel group of a first type when the UPnP complaint network device is operating as the first printer, and using another logical channel group of a second type when the UPnP complaint network device is operating as the second printer.

9. The UPnP complaint network device according to claim 1, wherein communication between the network protocol controller and the device controller is executed by means of packet communication using a plurality of bidirectional logical channels assigned to each different application.

10. The UPnP complaint network device according to claim 9, wherein
each logical channel is capable of realizing a first operating mode wherein the network protocol controller is on a requesting end, and a second operating mode wherein the device controller is on a requesting end, depending on a particular purpose; and
a request message body and a response message body for each logical channel are provided with a specific field for storing a particular type of information for notification by a sender to a recipient.

11. The UPnP complaint network device according to claim 10, wherein a URI for notification by the sender to the recipient is appended to a front end of a message body for each logical channel, the front end of the message body being a part of the message body from which the specific field is excluded.

12. The UPnP complaint network device according to claim 9, wherein the network protocol controller and the device controller have:

(i) a global information transmission mode for sending and receiving between the network protocol controller and the device controller global information to be exchanged between the device controller and the client on the network, and
(ii) a local information transmission mode for sending and receiving between local information to be exchanged between the network protocol controller and the device controller irrespective of the client on the network,
and wherein the global information transmission mode and the local information transmission mode are distinguished by means of a header of each message.

13. A method of controlling a Universal Plug and Play (UPnP) compliant network device, the UPnP complaint network device comprising a plurality of service devices for executing a service in response to a request from a client on a network, a single device controller configured to control the plurality of service devices, and a network protocol controller configured to operate on a message in accordance with both a UPnP protocol and a communications protocol different from the UPnP protocol and having a single IP address that is commonly used an IP address of the plurality of service devices, wherein each of the service devices does not have an unique IP address, the method comprising the step of:
(A) under control of the network protocol controller, receiving from a client on the network a message having a message header and a message body, and transferring content of the message body to the device controller, wherein the step (A) includes: interpreting the message header according to the UPnP protocol without interpreting the content of the message body received from the client, and transmitting the message body to the device controller according to the communications protocol different from the UPnP protocol; and
under control of the device controller, interpreting the content of the message body received from the network protocol controller, and causing one or more of the plurality of service devices to execute a service according to a result of the interpretation.

14. A Universal Plug and Play (UPnP) compliant network device comprising:
a network protocol controller configured to operate on a message in accordance with both a UPnP protocol and a communications protocol different from the UPnP protocol;
a plurality of service devices configured to execute a service in response to a request from a client on a network; and
a single device controller which controls the plurality of service devices,
wherein the network protocol controller receives from a client on the network a message having a message header and a message body, and transfers content of the message body to the device controller, wherein the network protocol controller has a single IP address that is commonly used as an IP address of the plurality of service devices, each of the service devices not having an unique IP address, and
wherein the network protocol controller interprets the message header according to the UPnP protocol without interpreting the content of the message body, and transmits the message body to the device controller according to the communications protocol different from the UPnP protocol.

* * * * *